| (12) | United States Patent<br>Nakai | (10) Patent No.: US 12,215,978 B2<br>(45) Date of Patent: Feb. 4, 2025 |
|---|---|---|

(54) INFORMATION PROCESSING DEVICE, INFORMATION PROCESSING METHOD, AND INFORMATION PROCESSING SYSTEM

(71) Applicant: SONY GROUP CORPORATION, Tokyo (JP)

(72) Inventor: Mikio Nakai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 340 days.

(21) Appl. No.: 17/754,159

(22) PCT Filed: Sep. 16, 2020

(86) PCT No.: PCT/JP2020/035064
§ 371 (c)(1),
(2) Date: Mar. 25, 2022

(87) PCT Pub. No.: WO2021/065510
PCT Pub. Date: Apr. 8, 2021

(65) Prior Publication Data
US 2022/0290996 A1 Sep. 15, 2022

(30) Foreign Application Priority Data
Oct. 3, 2019 (JP) .................................. 2019-183103

(51) Int. Cl.
*G01C 21/28* (2006.01)
(52) U.S. Cl.
CPC .................................. *G01C 21/28* (2013.01)
(58) Field of Classification Search
CPC ...... G01C 21/28; G01C 21/1652; G05D 1/02; G08G 5/0039
See application file for complete search history.

(56) References Cited

U.S. PATENT DOCUMENTS

2004/0013295 A1  1/2004  Sabe et al.
2012/0307207 A1* 12/2012  Abraham ............ A61F 9/00802
                                              73/1.79
(Continued)

FOREIGN PATENT DOCUMENTS

| CN | 110238838 A | 9/2019 |
|---|---|---|
| EP | 3537249 A1 | 9/2019 |

(Continued)

OTHER PUBLICATIONS

International Search Report and Written Opinion of PCT Application No. PCT/JP2020/035064, issued on Nov. 10, 2020, 09 pages of ISRWO.

*Primary Examiner* — Donald J Wallace
(74) *Attorney, Agent, or Firm* — CHIP LAW GROUP

(57) ABSTRACT

To improve accuracy of position estimation on the basis of a plurality of estimation results.

An information processing device includes: a first estimator that estimates a self-position on the basis of a first coordinate system; a second estimator that estimates a self-position on the basis of a second coordinate system different from the first coordinate system; and an information acquisition part that, in a case where reliability of one of a first estimation result by the first estimator and a second estimation result by the second estimator in a coordinate system of the one estimation result is lower than a predetermined threshold, acquires self-position information on the basis of another estimation result.

19 Claims, 9 Drawing Sheets

(56) References Cited

U.S. PATENT DOCUMENTS

2019/0220998 A1* 7/2019 Horita .................. G06T 3/4038
2019/0278289 A1    9/2019 Nakajima
2020/0387162 A1* 12/2020 Kobayashi ............ G05D 1/027

FOREIGN PATENT DOCUMENTS

| JP | 3945279 B2 | 7/2007 |
| JP | 2012-242967 A | 12/2012 |
| JP | 2019-159520 A | 9/2019 |
| WO | 2019/111701 A1 | 6/2019 |
| WO | 2019/138836 A1 | 7/2019 |

* cited by examiner

FIG. 3
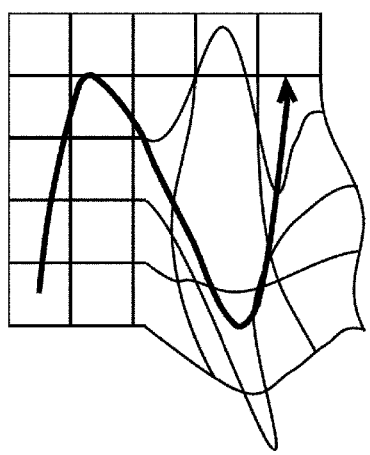
FIRST COORDINATE SYSTEM
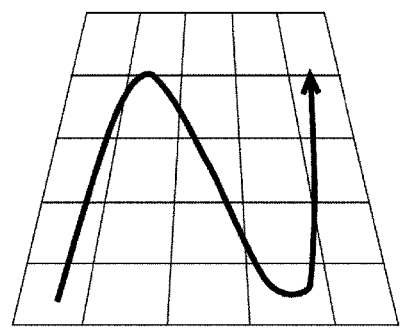
SECOND COORDINATE SYSTEM
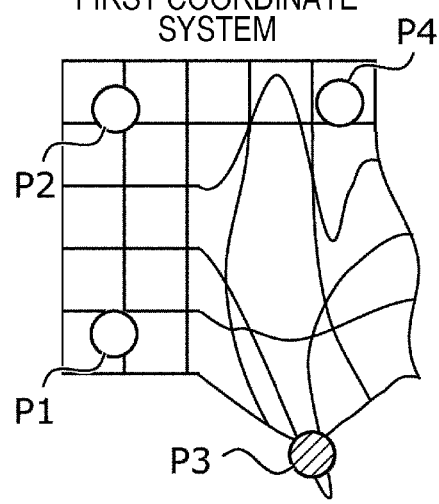
FIRST COORDINATE SYSTEM
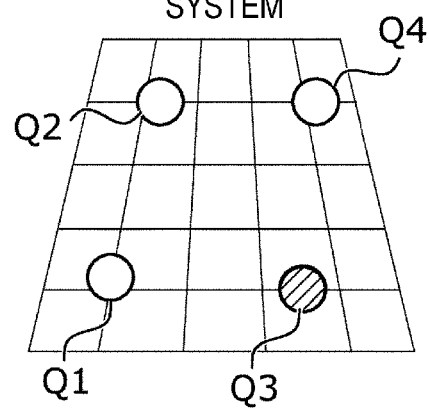
SECOND COORDINATE SYSTEM

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2020/035064 filed on Sep. 16, 2020, which claims priority benefit of Japanese Patent Application No. JP 2019-183103 filed in the Japan Patent Office on Oct. 3, 2019. Each of the above-referenced applications is hereby incorporated herein by reference in its entirety.

TECHNICAL FIELD

The present disclosure relates to an information processing device, an information processing method, an information processing system, and a program.

BACKGROUND ART

Technologies have been developed in which a movable body automatically moves using a computer or the like, such as autonomous operation of a robot and automatic driving of an automobile. In such automatic movement, a technology of localization in which a moving device estimates its own position in a map is an important technology. Against this background, a technology of correcting a localization result on the basis of position information that can be acquired by a plurality of means, such as position information using light detection and ranging (LiDAR), global positioning system (GPS), or the like, has been studied.

CITATION LIST

Patent Document

Patent Document 1: Japanese Patent Application Laid-Open No. 2012-242967

SUMMARY OF THE INVENTION

Problems to be Solved by the Invention

However, in the algorithm of localization by means of acquiring information, there is a timing at which the reliability decreases, such as a timing at which an object having a high reflectance is present in a wide range in the case of LiDAR, and a timing at which a shielding object is present between the moving device and a satellite in the case of GPS. In a case where such an environment not suitable for acquiring information is present in a range where the movable body can move, it is difficult to perform highly accurate localization by performing correction using a plurality of localization results.

In view of the foregoing, the present disclosure provides an information processing device, an information processing method, an information processing system, and a program that improve accuracy of position estimation on the basis of a plurality of estimation results.

Solutions to Problem

According to an embodiment, an information processing device may include: a first estimator that estimates a self-position on the basis of a first coordinate system; a second estimator that estimates a self-position on the basis of a second coordinate system different from the first coordinate system; and an information acquisition part that, in a case where reliability of one of a first estimation result by the first estimator and a second estimation result by the second estimator in a coordinate system of the one estimation result is lower than a predetermined threshold, acquires self-position information on the basis of another estimation result.

The information processing device may further include a coordinate transformer that transforms a position in the second coordinate system into a position in the first coordinate system, and the information acquisition part may acquire the self-position information on the basis of at least one of the first estimation result or the second estimation result transformed into the first coordinate system. In this way, the estimation result of each estimation device may be transformed into the first coordinate system serving as the reference coordinate system.

The information acquisition part may acquire the self-position information on the basis of the first estimation result in a case where a reliability of the first estimation result is equal to or higher than the predetermined threshold, and acquire localization information in the first coordinate system on the basis of the second estimation result transformed by the coordinate transformer in a case where the reliability of the first estimation result is lower than the predetermined threshold. As described above, in a case where the reliability of the first estimation result is low, a result of performing transformation using the second estimation result may be used as the localization result.

The information acquisition part may be configured to not generate the self-position information in a case where a distance between the first estimation result and the second estimation result transformed by the coordinate transformer acquired at the same timing is longer than a predetermined distance. In this manner, the self-position need not be estimated when the error is large.

The information processing device may further include: a control point acquisition part that acquires, as a control point, a combination of the first estimation result and the second estimation result acquired at the same timing; a control point storage that stores the control point acquired by the control point acquisition part; and a parameter generator that generates a transformation parameter used for transformation by the coordinate transformer on the basis of a first predetermined number or more of the control points stored in the control point storage. In this manner, the control point may be acquired to acquire the transformation parameter from the second coordinates to the first coordinates.

The control point acquisition part may, in a case where the second estimation result for the same time as the acquired first estimation result does not exist, correct the second estimation result acquired in the past to an estimation result at the time when the first estimation result is acquired, and, in a case where the first estimation result for the same time as the acquired second estimation result does not exist, correct the first estimation result acquired in the past to an estimation result at the time when the second estimation result is acquired, and acquire the control point. In this manner, the control point used for the transformation parameter generation can be generated from the estimation results acquired in the past.

Regarding one acquired estimation result, the control point acquisition part may correct a most recent past another estimation result by dead reckoning. In this manner, the control point may be acquired as information at the same timing by calculating a gap due to a time difference of data acquisition by the estimators by dead reckoning, for example. The dead reckoning may be odometry. As the odometry, for example, an internal sensor such as a wheel encoder or an inertial measurement unit (IMU) provided in a wheel of a movable body may be used.

In a case where at least one of the reliability of the first estimation result or the reliability of the second estimation result at the same timing is lower than a predetermined threshold, the control point acquisition part may be configured to not acquire a combination at the timing as the control point. In this manner, it is possible to not include the estimation result with low reliability in the control point.

The control point acquisition part may delete one or a plurality of the control points stored in the control point storage in a case where the control points stored in the control point storage are equal to or more than a second predetermined number. In this manner, the number of control points used for coordinate transformation may be limited.

The control point acquisition part may delete the control points in ascending order of acquired time. In this manner, outdated information may be deleted from the control points.

The control point acquisition part may delete the control points in ascending order of reliability of any one of the first estimation result or the second estimation result. In this manner, information with low reliability may be preferentially deleted from the control points.

The control point acquisition part may set an environment in which the first estimation result is not used and an environment in which the second estimation result is not used, and may be configured to not acquire the control point in these environments. In this manner, an environment not used as a control point for generation of the transformation parameter may be set.

The first estimator and the second estimator may set an environment in which no estimation is performed, and may be configured to not estimate the self-position in these environments. In this manner, an environment in which the estimation result is not acquired may be set.

These environments may be set by the user. Additionally, these environments may be set on the basis of a sensor used for estimation of the self-position or an algorithm that executes estimation of the self-position on the basis of the sensor. Moreover, an environment with low reliability may be set from past estimation results, and these environments may be set according to time, brightness, weather, and the like.

The information processing device may further include a third estimator, . . . , and an Nth estimator (integer of N≥3). The coordinate transformer may transform a coordinate system of each of the estimators into the first coordinate system, and the information acquisition part may acquire the self-position information on the basis of position information estimated by each of the transformed estimators. As described above, three or more estimators may be provided.

According to an embodiment, an information processing system may include: a movable body including a first acquisition part that acquires information for estimating a self-position in a first coordinate system, and a second acquisition part that acquires information for estimating a self-position in a second coordinate system different from the first coordinate system; and a first estimator that acquires a first estimation result based on information acquired by the first acquisition part, a second estimator that acquires a second estimation result based on information acquired by the second acquisition part, and an information acquisition part that, in a case where reliability of one of the first estimation result and the second estimation result in a coordinate system of the one estimation result is lower than a predetermined threshold, acquires position information of the movable body on the basis of another estimation result, provided inside or outside the movable body. While an acquisition part that acquires information for estimating the position of the movable body is provided in the movable body, other configurations may be appropriately provided in a computer such as an external server.

According to one embodiment, an information processing device includes: a first estimator that estimates a self-position in a first coordinate system; a second estimator that estimates a self-position in a second coordinate system different from the first coordinate system; a coordinate transformer that transforms a second estimation result by the second estimator from the second coordinate system to the first coordinate system on the basis of a transformation parameter; a storage that stores the first estimation result and the second estimation result as a control point in a case where a reliability of the first estimation result by the first estimator at a time of interest and the reliability of the second estimation result by the second estimator at the time of interest are equal to or higher than a predetermined threshold; and a parameter generator that generates the transformation parameter on the basis of the control point at the time of interest stored in the storage and the control point before the time of interest. As described above, in a case where the reliability of both the first estimation result and the second estimation result is high, a transformation parameter for transforming the second coordinate into the first coordinate may be generated.

According to an embodiment, provided are: a first estimator that estimates a self-position in a first coordinate system; a second estimator that estimates a self-position in a second coordinate system different from the first coordinate system; a coordinate transformer that transforms a second estimation result by the second estimator from the second coordinate system to the first coordinate system on the basis of a transformation parameter; a storage that sets a first region having low reliability of a first estimation result by the first estimator, evaluates the reliability to be low if the first estimation result at a time of interest is within the first region and evaluates the reliability to be high if the first estimation result at the time of interest is outside the first region, and stores the first estimation result at the time of interest and the second estimation result at the time of interest as a control point in a case where the reliability of the first estimation result at the time of interest is high; and a parameter generator that generates the transformation parameter on the basis of the control point at the time of interest stored in the storage and the control point before the time of interest. As described above, it is possible to evaluate the reliability not by the threshold, but by the region and the environment to which the estimation result belongs.

The first region may be a region set in advance. For example, the first region may be set in advance manually by the user or automatically from a past estimation result.

The first region may be a region set on the basis of the reliability of the first estimation result. In this manner, the first region may be corrected even during the execution of the estimation.

The second estimation result at a time of interest may be acquired by correcting the second estimation result acquired most recently in the past with respect to the time of interest to the time of interest. As described above, the control point may be acquired on the basis of the estimation result corrected to the same time.

The first estimator and the second estimator may perform estimation by star reckoning, and the correction to the second estimation result at the time of interest may be performed on the basis of a result estimated by dead reckoning. In this manner, the absolute estimated position by star reckoning may be corrected by the relative estimated position by dead reckoning.

BRIEF DESCRIPTION OF DRAWINGS

FIG. 3 is a diagram illustrating a relationship between two coordinate systems according to the embodiment.

MODE FOR CARRYING OUT THE INVENTION

Figure 1:
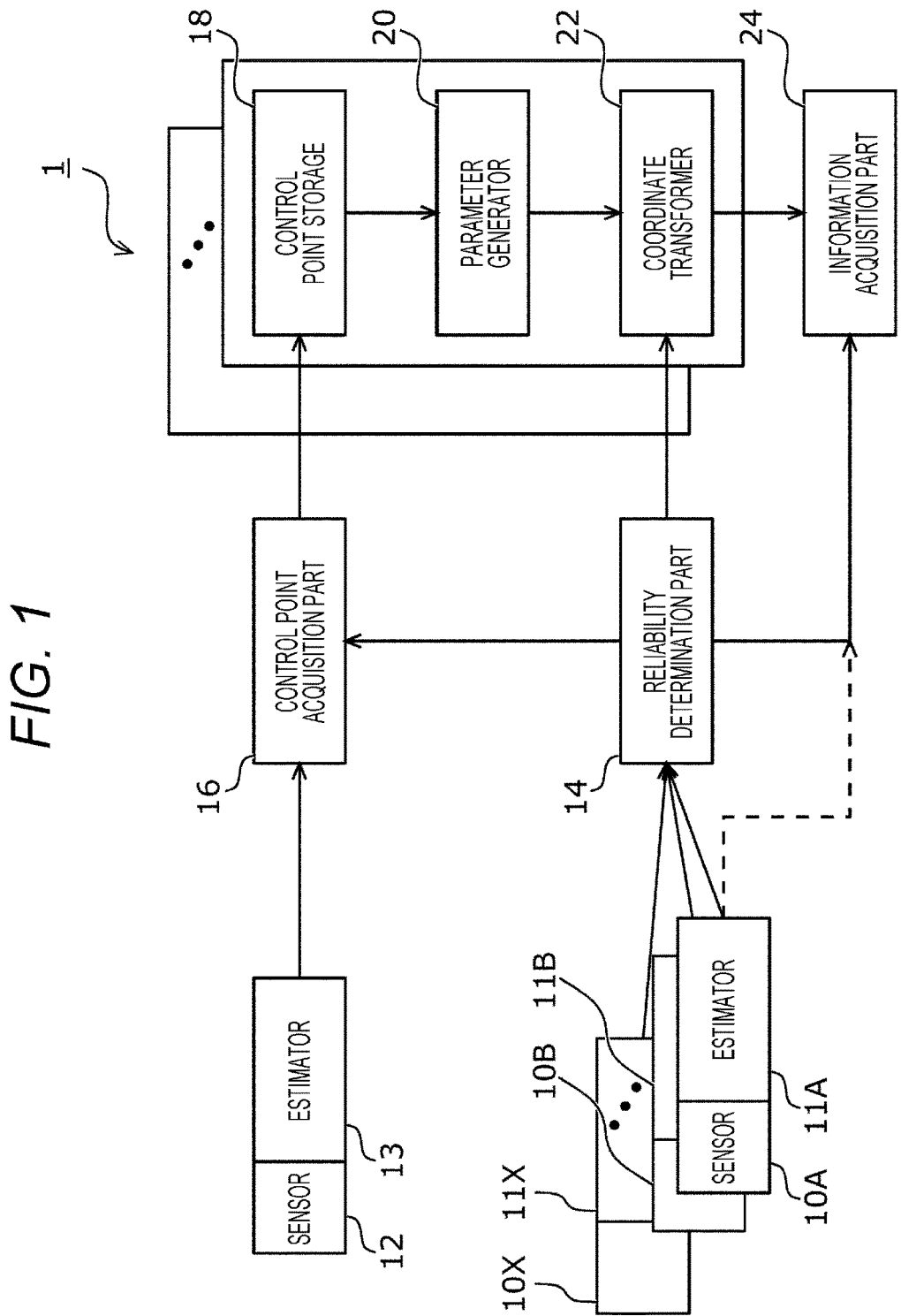
FIG. 1 is a block diagram of a position estimation system according to an embodiment.

First, some general technical terms used in the present disclosure will be described.

"Self-position" indicates, for example, the position of a movable body itself that moves automatically. This position is not limited to two-dimensional information, and may include three-dimensional information. This position is indicated by an absolute position or a relative position. Additionally, in the present disclosure, localization may be a concept of estimating, together with the position information, the attitude of the movable body, that is, information such as the direction of the movable body.

"Absolute position" is, for example, information indicating coordinates on a map or in a coordinate system in which the origin is determined. The coordinate system may be any coordinate system as long as it is a coordinate system in which a uniquely appropriate position is specified, such as orthogonal coordinates, cylindrical coordinates, and spherical coordinates.

"Relative position" is, for example, information indicating in what direction and by what distance the movable body has moved from position information acquired one frame before while moving. That is, a relative position indicates position information indicated by the difference between a past position and a current position.

"Star reckoning" is a method of estimating an absolute self-position. In view of the above definition, for example, star reckoning is a method of estimating a position on a map, and is a method of acquiring position information according to a current surrounding environment or the like without depending on a past result. Since star reckoning does not depend on a past result, an error caused by a past estimation result is not accumulated in the estimation even if the estimation is continuously performed for a long time. Star reckoning includes, for example, positioning by GPS, mapping of feature points by a captured image, a method of performing normal distributions transform (NDT) matching of an input from LiDAR, and the like, but the star reckoning in the present disclosure is not limited thereto.

"Dead reckoning" is a method of estimating a relative self-position. In view of the above definition, for example, dead reckoning is a method of estimating a position relative to past position information from the past position information and information such as speed, roll, pitch, yaw, and torque. In dead reckoning, scanning is performed consecutively at a high rate, and control information can be used as it is. On the other hand, since dead reckoning depends on past data, there is a possibility that an error may accumulate. Dead reckoning includes, for example, wheel odometry, visual simultaneous localization and mapping (SLAM), depth SLAM, and the like. Additionally, some star reckoning methods can also be applied as dead reckoning.

Hereinafter, embodiments of the present disclosure will be described with reference to the drawings. In the description, as an example, the movable body is a robot, and the self-position of the robot is estimated. However, the movable body is not limited to a robot, and may be, for example, a vehicle, a flying object, or the like. The robot has a plurality of types of localization functions for estimating a self-position and an attitude on the basis of, for example, sensed information of a sensor and an algorithm for transforming the sensed information into position information.

First Embodiment

FIG. 1 is a block diagram of a position estimation system 1 according to an embodiment. A position estimation system 1 includes, for example, a sensor 10, an estimator 11, a sensor 12, an estimator 13, a reliability determination part 14, a control point acquisition part 16, a control point storage 18, a parameter generator 20, a coordinate transformer 22, and an information acquisition part 24.

The sensor 10 senses information necessary for performing one method of star reckoning. Information sensed by the sensor 10 is output to the corresponding estimator 11.

The estimator 11 functions as a self-position estimation device that estimates the self-position from information output from the corresponding sensor 10 using an algorithm belonging to star reckoning effective for the sensor. The self-position is estimated as an absolute position in a coordinate system determined by the sensor and the algorithm.

For example, as illustrated in FIG. 1, the sensor 10 and the corresponding estimator 11 include a first sensor 10A and a first estimator 11A that is a corresponding self-position estimation device, a second sensor 10B and a second estimator 11B that is a corresponding self-position estimation device, ... and so on. The first estimator 11A estimates a first estimation result in a first coordinate system from information sensed by the sensor 10A using a first algorithm. Similarly, the second estimator 11B estimates a second estimation result in a second coordinate system from information sensed by the sensor 10B using a second algorithm.

As described above, in the position estimation system 1, the plurality of sensors 10 and estimators 11 acquires a plurality of estimation results in a plurality of coordinate systems by two or more types of star reckoning. For example, there may be N sets (N≥3) of combinations of the sensor 10 and the estimator 11 including the sensors 10A, 10B, ..., and 10X and the estimators 11A, 11B, ..., and 11X. In this case, the first estimation result, the second estimation result, . . . , and the Nth estimation result are estimated by the estimators 11A, 11B, . . . , and 11X on the basis of information sensed by the corresponding sensors 10.

Among the N sets of combinations of the sensor 10 and the estimator 11, the first coordinate system used in one set, such as the combination of the first sensor 10A and the first estimator 11, is set as a parent coordinate system. The position estimation system 1 uses or outputs a position or coordinates in the first coordinate system, which is the parent coordinate system, as an estimation result. In the present disclosure, one set of the sensor 10 and the estimator 11 that output an estimation result in the coordinate system that is the parent coordinate system is expressed as a first sensor 10A and a first estimator 11A.

The first coordinate system as parent coordinates can be set on the basis of conditions such as a system in which a topological map is generated, a system in which the coordinate system does not change halfway due to data reset, a system in which re-localization can be performed at the time of starting localization, a system in which scanning can be performed with high frequency and high accuracy, and a system with little distortion, for example.

Note that, in the sensor 10 and the corresponding estimator 11, the sensing cycle of the sensor or the estimation time of the estimator varies depending on the type of the sensor and the algorithm to be used. Each estimator 11 may output the estimation result (and reliability) to the reliability determination part 14 at the timing when the estimation result is acquired.

The sensor 12 senses information necessary for performing one method of dead reckoning. Information sensed by the sensor 12 is output to the estimator 13. The sensor 12 may be, for example, a sensor provided on an axle, an IMU, a camera, or the like.

The estimator 13 functions as a self-position estimation device that estimates the self-position from information output from the sensor 12 using an algorithm belonging to dead reckoning effective for the sensor. The self-position is a relative position with respect to a past position of the robot, and is estimated, for example, on the basis of a time notification of which is given from the control point acquisition part 16. For example, the sensor 12 is a sensor that acquires the speed, the rotation angle, and the like of a wheel accompanying the robot, and the estimator 13 estimates the relative position from the output of the sensor 12 by odometry.

Note that while there is one set of the sensor 12 and the estimator 13, the present invention is not limited thereto, and there may be two or more sets of the combination of the sensor 12 and the estimator 13. For example, in addition to the sensor of the wheel described above, a camera may be provided as the sensor 12, and the estimator 13 may perform localization by SLAM.

The reliability determination part 14 determines the reliability of the N estimation results estimated by the estimators 11A, . . . , and 11X. The reliability may be calculated by the reliability determination part 14 on the basis of each algorithm, or may be calculated by each estimator 11 on the basis of the timing of acquiring the estimation result. In the case where the reliability is calculated in the estimator 11, the reliability may be calculated on the basis of the state of the corresponding sensor 10. The reliability determination part 14 determines, for example, whether or not the reliability acquired from each estimator 11 is equal to or higher than a predetermined threshold. As described above, each estimator 11 outputs the estimation result (and reliability) to the reliability determination part 14 at the timing when the estimation result is acquired.

For example, in the case of a sensor that receives radio waves from a GPS, the reliability may be calculated using the number of satellites from which radio waves can be received. For example, in the case of a LiDAR sensor, the reliability may be calculated on the basis of the intensity of reflected light. For example, in the case of a sensor that acquires a feature point, the reliability may be calculated on the basis of at least one of an error between the feature points acquired in the estimation of mapping and the feature points to be mapped or the number of the feature points.

The first estimation result may be output to the information acquisition part 24 regardless of the reliability as indicated by a broken line. Additionally, the first estimation result may be output to the information acquisition part 24 on the basis of the determination of the reliability determination part 14. For example, in the case where the first estimation result is output to the information acquisition part 24 regardless of the reliability, if no other estimation result is output, the first estimation result may be acquired and output as the self-position.

As another example, in a case where the reliability of the acquired first estimation result is equal to or higher than a predetermined threshold, the reliability determination part 14 may output the first estimation result to the control point acquisition part 16 and the information acquisition part 24 as a reliable result. In a case where the reliability of another acquired estimation result is equal to or higher than the predetermined threshold, the estimation result having the reliability equal to or higher than the predetermined threshold is output to the control point acquisition part 16. In a case where the reliability of an estimation result other than the first estimation result acquired at a certain timing is equal to or higher than the predetermined threshold and the reliability of the most recent past first estimation result is lower than the predetermined threshold, the estimation result acquired at the certain timing is output to the coordinate transformer 22.

Note that the predetermined threshold may be normalized when calculating the reliability of each estimation result so that the same value can be used for all the estimation results, or may be normalized by converting a threshold calculated by a predetermined function or the like set for each estimation result, for example. Additionally, as another example, the predetermined threshold may be set as different values in each estimator 11.

The control point acquisition part 16 acquires the first estimation result and one of other estimation results determined to have high reliability by the reliability determination part 14 for the same time. For example, in a case where another estimation result has been acquired at the same timing as when the first estimation result has been acquired, a combination thereof is acquired as a control point. However, in general, estimation results are rarely transmitted from the estimators 11 at the same timing. For this reason, the control point acquisition part 16 corrects the estimation result on the basis of the estimation result of the estimator 13.

In a case where the control point acquisition part 16 acquires the first estimation result at a certain timing, a time difference from the timing at which another most recent estimation result is obtained is calculated. The estimator 13 calculates a relative position attributable to the time difference in the coordinate system of the other estimation result on the basis of the time difference. The control point acquisition part 16 acquires another estimation result of the timing on the basis of the absolute position and the relative position of the other estimation result. As a result, a pair of the first estimation result and another estimation result at the same timing is acquired as a control point. Note that the most recent other estimation result may be stored in a storage (not illustrated) included in the position estimation system 1.

For example, in a case where two types of the sensor 10 and the estimator 11 are provided, the control point is generated using the first estimation result and the second estimation result. In a case where three or more types of the sensor 10 and the estimator 11 are provided, as described above, the result of the estimator 11 that has output the most recent estimation result with respect to the timing may be used to acquire a control point that is a pair of the estimation result and the first estimation result. As another example, among the sensors 10 and the estimators 11, some or all of the estimation results that are acquired from the acquisition of the previous first estimation result to the acquisition of the estimation result of the timing and have reliability higher than a predetermined threshold may be used to acquire a control point with the estimators 11 that have output these estimation results.

On the other hand, in a case where the control point acquisition part 16 acquires an estimation result other than the first estimation result at a certain timing, the control point acquisition part 16 estimates a relative position attributable to the time difference with respect to the most recent first estimation result. A pair of the first estimation result and another estimation result at the timing is acquired as a control point on the basis of the most recent first estimation result and the relative position attributable to the time difference.

The control point acquisition part 16 stores the acquired control point in the control point storage 18. There may be a plurality of sets, such as N−1 sets, of the control point storage 18, and the parameter generator 20 and the coordinate transformer 22 to be described later, so that parallel calculation can be executed for the sensors 10 and the estimators 11. For example, a control point storage 18B, a parameter generator 20B, and a coordinate transformer 22B may be provided for the sensor 10B and the estimator 11B, . . . , and a control point storage 18X, a parameter generator 20X, and a coordinate transformer 22X may be provided for a sensor 10X and an estimator 11X. By providing one-to-one correspondence in this manner, it is possible to calculate storage of control points, generation of parameters, and coordinate transformation in parallel in different processors, for example.

The parameter generator 20 generates a transformation parameter for transformation from another coordinate system to the first coordinate system by using the plurality of control points stored in the control point storage 18. A case of transformation from the second coordinate system to the first coordinate system will be described. Other coordinate systems can be similarly processed.

The parameter generator 20 acquires a control point that is a pair of the first estimation result and the second estimation result from the control point storage 18. In a case where a first predetermined number or more of control points are required for transformation from the second coordinate system to the first coordinate system, the first predetermined number or more of control points are acquired. In a case where the first predetermined number or more of control points are not in the control point storage 18, for example, a transformation parameter set as an initial value may be used, or the transformation parameter need not be calculated until the first predetermined number or more of control points can be acquired.

The first predetermined number, which is the necessary number of control points used for parameter generation, depends on the calculation algorithm of the coordinate transformation parameter, the number of dimensions of the localization result, and the like. Information such as the first predetermined number may be described and set in, for example, a setting file or the like provided in the position estimation system 1. For example, the parameter generator 20 may acquire the information in the setting file to acquire the first predetermined number and determine whether or not parameter generation is possible.

In a case where the first predetermined number or more of control points are stored, the first predetermined number or more control points used for the parameter generation is selected by an arbitrary method. For example, the parameter generator 20 may select a pair having high reliability, a pair having a large variance in the first coordinates, a pair having a new acquired timing, or the like, or may select by a method combining the above. Additionally, the number of pairs of control points to be used may be limited not to exceed a predetermined number to prevent overfitting or to prevent the processing time from becoming too long.

Additionally, it is possible to prevent the number of control points exceeding a second predetermined number from being stored in the control point storage 18, on the basis of the number of pairs that may cause overfitting of the parameter generator 20, the number of pairs that increase the processing cost, the size of the memory, and the like. In this processing, for example, in a case where the storage number exceeds the second predetermined number at the timing when the control point acquisition part 16 stores control point data in the control point storage 18, the stored control point data may be deleted by an arbitrary method. In this deletion, for example, as described above, a pair having high reliability, a pair having a large variance in the first coordinates, a pair having a new acquired timing, or the like may remain, or the above may be combined.

For example, the parameter generator 20 generates the transformation parameter by a georeferencing method which is a method of superimposing raster data on map data. More specifically, a similarity transformation such as scale transformation, rotation, translation, and mirror image, an affine transformation combining similarity transformation and shearing, a projective transformation, rubber-sheeting (polynomial, thin plate spline), or various nonlinear transformation methods are used.

The coordinate transformer 22 transforms the estimation result input on the basis of the parameter generated by the parameter generator 20 into the first coordinate system. The transformation parameter generated by the parameter generator 20 may be stored in the coordinate transformer 22, or may be separately stored in a storage (not illustrated) and be read as necessary.

The information acquisition part 24 acquires information on the absolute position at the current time point on the basis of the first estimation result or an estimation result other than the first estimation result transformed into the first coordinate system. The information acquired by the information acquisition part 24 may be appropriately output and used for autonomous behavior of the robot or the like, or may be output to the outside through a network or the like.

All the components illustrated in FIG. 1 may be provided in the robot. In this case, it is possible to execute localization of the robot in a closed state only by the robot.

As another example, at least a part of the sensor 10 and the estimator 11, and the sensor 12 and the estimator 13 may be provided in the robot, and other components may be provided in, for example, a computer or the like capable of communicating with the robot belonging to a user space in which the robot operates. In this case, the robot may estimate its self-position while communicating with the computer or the like.

In each of the above examples, the sensors 10 and 12 need not be included in the position estimation system 1. For example, a system that can acquire sensing information from the sensors 10 and 12 and perform the above processing using the sensing information of the sensors 10 and 12 may be used as the position estimation system 1. Furthermore, the estimators 11 and 13 also need not be included in the system, and in this case, the position estimation system 1 may be configured as a system including an acquisition part that acquires an output from the estimators 11 and 13, and capable of executing localization using each sensor and each estimation value acquired by the acquisition part.

As still another example, two or more robots may be provided in user spaces at least partially overlapping with each other. In this case, each robot may include a required number of sensors and estimators, and other components may be included in any robot. Additionally, the self-position estimated in each robot may be exchanged between the robots to avoid collision or the like. Moreover, in a case where the same type of sensor and estimator are used, a parameter generated in each robot may be adjusted to generate and acquire a parameter with higher accuracy. In a case where there is a plurality of movable bodies as described above, for example, maps of the plurality of movable bodies may be combined on the basis of a reference measurement value such as a landmark.

Figure 2:
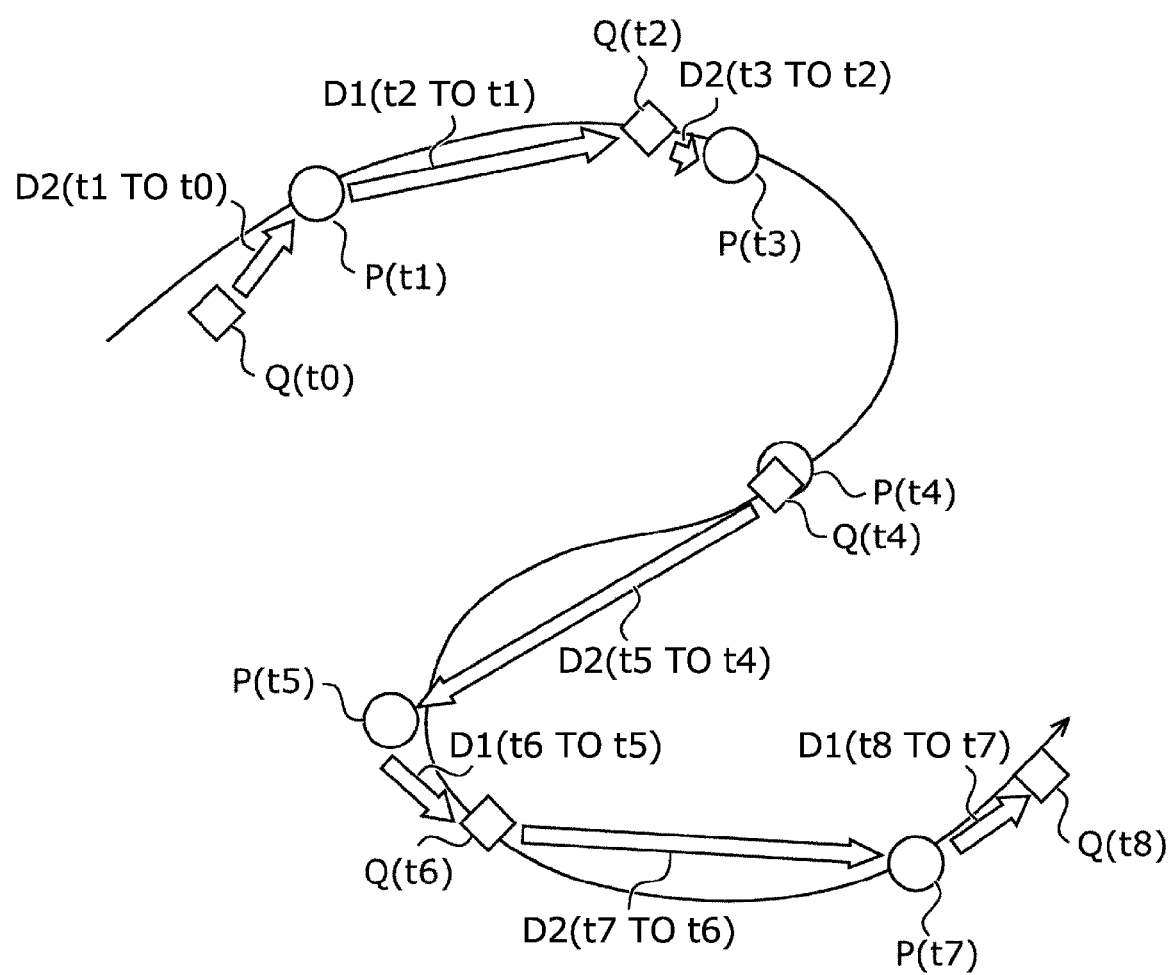
FIG. 2 is a schematic diagram illustrating an outline of control point collection according to the embodiment.

FIG. 2 is a diagram schematically illustrating an outline of control point acquisition by the control point acquisition part 16 according to the embodiment. FIG. 2 is an example in which the first sensor 10A, the first estimator 11A, the second sensor 10B, and the second estimator 11B are provided, and a path indicated by a solid arrow is followed in the first coordinate system. P ( ) is a position based on the first estimation result, and Q ( ) is a position based on the second estimation result. While the second estimation result is transformed into the first coordinate system for convenience to represent the second estimation result in the drawing, in the control point acquisition, the following processing is performed using the position of the second coordinate system before transformation into the first transformation system. The first estimation results are acquired at times t=t1, t3, t4, t5, and t7, and the second estimation results are acquired at times t=t0, t2, t4, t6, and t8.

Hereinafter, it is assumed that the reliability is equal to or higher than a predetermined threshold in each estimation result.

The first estimator 11A acquires a first estimation result P (t1) at time t1. The control point acquisition part 16 generates the second estimation result at time t1 using a second estimation result Q (t0) at time t0 most recently acquired by the second estimator 11B. This generation is performed using a dead reckoning method in the second coordinate system acquired from the sensor 12 and the estimator 13. An estimated value of dead reckoning between times t0 and t1 in the second coordinate system is represented as D2 (t1~t0). The control point acquisition part 16 acquires a position in the second coordinate system of dead reckoning between times t0 and t1 from the estimator 13. Subsequently, the control point acquisition part 16 calculates the second estimation result at time t1 as Q (t1)=Q (t0)+D2 (t1~t0). This may be calculated, for example, as a sum of vectors or a sum of elements. Then, a pair of the first estimation result P (t1) and the second estimation result Q (t1) at time t1 is stored in the control point storage 18 as a control point.

The second estimator 11B acquires a second estimation result Q (t2) at time t2. The control point acquisition part 16 generates the first estimation result at time t2 using the first estimation result P (t1) at time t1 acquired most recently by the first estimator 11A. This generation is performed by dead reckoning in a manner similar to that as described above. An estimated value of dead reckoning between times t1 and t2 in the first coordinate system is represented as D1 (t2~t1). The control point acquisition part 16 calculates the first estimation result at time t2 as P (t2)=P (t1)+D1 (t2~t1). Then, a pair of the first estimation result P (t2) and the second estimation result Q (t1) at time t2 is stored in the control point storage 18 as a control point.

As described above, on the basis of the timings at which the estimation results are obtained from the estimators, the control point acquisition part 16 generates the first estimation result and the second estimation result for the same time, and stores the pair in the control point storage 18 as a control point.

In a case where a first estimation result P (t4) and a second estimation result Q (t4) are acquired at time t4, the control point may be set without performing correction by dead reckoning.

Assume that a first estimation result P (t5) is acquired at time t5 and D2 (t5~t4) is calculated by the estimator 13. In a case where D2 (t5~t4) is longer than a predetermined distance, the control point acquisition part 16 may determine that a second estimation result Q (t5) for the first estimation result P (t5) cannot be acquired. This is because there is a possibility that errors will accumulate due to dead reckoning, and a decrease in accuracy of control point acquisition and transformation parameter generation due to the accumulation of errors needs to be curbed. Additionally, while the determination is made on the basis of the distance output by the estimator 13, the present invention is not limited thereto. For example, in a case where the magnitude of the value of t5~t4, that is, the time for relative position estimation by the estimator 13 exceeds a predetermined time, the control point acquisition part 16 may be configured to not acquire the value as the control point.

The parameter generator 20 generates a transformation parameter for transformation from the second coordinate system to the first coordinate system from the plurality of control points that is pairs of the first estimation result of the first coordinate system and the second estimation result of the second coordinate system for the same time acquired in this manner.

While the case where the reliability is high has been described, a case where the reliability is low will be described below. For example, in a case where the reliability of a second estimation result Q (t6) is lower than a predetermined threshold, the reliability determination part 14 does not transmit the second estimation result Q (t6) to the control point acquisition part 16, so that the control point is not acquired.

On the other hand, in a case where the reliability of the second estimation result Q (t6) is similarly lower than the predetermined threshold, assume a case where a control point of a first estimation result P (t7) at time t7 is acquired. In this case, since the reliability of the most recently acquired second estimation result Q (t6) is low, the control point acquisition part 16 may be configured to not acquire the control point without generating a second estimation result Q (t7) for the first estimation result P (t7). In order to perform such processing, the estimation result estimated by each estimator may be stored in the storage in association with the reliability.

While the above is a case of using the first estimation result and the second estimation result, the control point can similarly be acquired in a case of using a third estimation result, . . . , and an Nth estimation result. As described above, in a case where the first estimation result is acquired, N−1 estimated values of dead reckoning may be acquired, and an estimated value that meets the condition may be acquired as the control point. In a case where another estimation result is acquired, correction by dead reckoning may be performed on the most recently acquired first estimation result to acquire the first estimation result as the control point.

FIG. 3 is a diagram illustrating an example of transformation from the second coordinate system to the first coordinate system according to the present embodiment. The upper row shows the actual path followed by the robot, and the lower row shows the estimation results obtained by acquiring the first estimation result and the second estimation result at the same timing.

In the first estimation result, it is assumed that data in the first coordinate system is distorted, for example. In such a case, when the path as in the upper row is followed, distortion occurs in the localization result in the lower right as in the lower row, and the shifted position is estimated. For example, the first estimator 11A estimates the first estimation results P1, P2, P3, and P4.

The second coordinate system is distorted into a trapezoidal shape when transformed into the first coordinate system. In the second coordinate system, the path illustrated in the upper right is followed. For example, the second estimator 11B estimates the second estimation results Q1, Q2, Q3, and Q4 at the same time as the first estimation result.

In FIG. 3, the reliability of the first estimation result P3 becomes lower than the predetermined threshold. If such an estimation result is used for generating the transformation parameter, the accuracy of transformation in the coordinate transformer 22 is degraded. For this reason, by not using the pair of the first estimation result P3 and the second estimation result Q3 as the control point in a case where the reliability becomes lower than the predetermined threshold, the accuracy of the transformation parameter can be improved.

Figure 4:
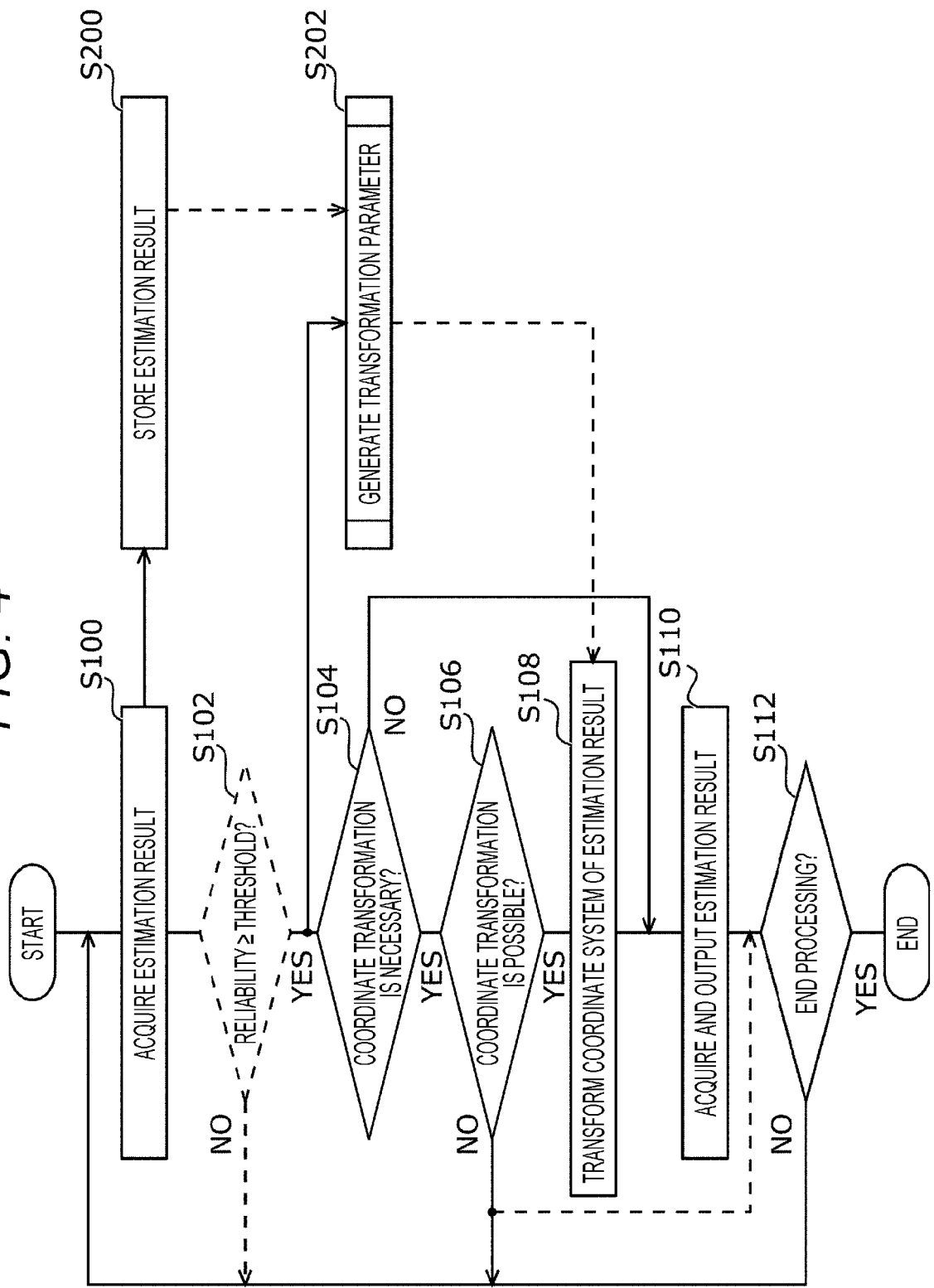
FIG. 4 is a flowchart illustrating processing according to the embodiment.

FIG. 4 is a flowchart illustrating processing according to the present embodiment.

First, the reliability determination part 14 acquires, from the sensor 10 and the estimator 11, an estimation result based on the coordinate system in the estimator 11 (S100). In a case where the estimator 11 generates the reliability, the reliability is similarly acquired.

The acquired estimation result and reliability may be stored in the storage (S200). The storage may be, for example, various nonvolatile or volatile memories, storages, or the like. In a case where S102 is executed, the data may be stored if the reliability is high and not stored if the reliability is low after the reliability determination in S102. Additionally, in a case where the reliability is determined in S200, the estimation result in the case where the reliability is low may be deleted. Moreover, the estimation result and the reliability may be stored in association with each other, and in this case, it is also possible to determine whether or not to set the control point on the basis of the reliability at the timing of referring to the estimation result.

Next, the reliability determination part 14 determines whether or not the reliability of the acquired estimation result is equal to or higher than a predetermined threshold (S102). If the reliability is lower than the predetermined threshold (S102: NO), the processing may return to the standby state for acquiring the estimation result. If the reliability is equal to or higher than the predetermined threshold (S102: YES), the processing proceeds to the next step. Note that this S102 may be omitted, and in this case, the information acquisition part 24 can output the localization result regardless of the reliability.

Next, it is determined whether or not it is necessary to transform the estimation result into the first coordinate system (S104). If the coordinate transformation is not necessary (S104: NO), the acquired estimation result is output to the information acquisition part 24.

If the coordinate transformation is necessary (S104: YES), the coordinate transformer 22 determines whether or not a transformation parameter to be used for coordinate transformation is generated and coordinate transformation is possible (S106). If the coordinate transformation is not possible (S106: NO), the processing may transition to an estimation result acquisition standby state, or as another example, as indicated by a broken line, the processing may transition to a step of determining whether to end the processing.

If the coordinate transformation is possible (S106: YES), the coordinate transformer 22 transforms the coordinate system of the estimation result into the first coordinate system (S108).

Next, the information acquisition part 24 acquires the first estimation result of the first coordinate system or another estimation result transformed into the first coordinate system as self-position information and outputs the self-position information (S110).

Next, for example, it is determined whether or not to end the processing according to the determination as to whether or not the robot continues the operation (S112). In the case of ending the processing (S112: YES), the position estimation system 1 ends the operation. In the case of not ending the processing (S112: NO), the processing transitions to an estimation result acquisition standby state.

In parallel with the processing from S104, in a case where the estimation result is acquired, processing of generating a transformation parameter on the basis of the estimation result is performed (S202). While this processing is performed as processing in parallel with the processing described above, for example, the processing of S104 to S110 may be preferentially performed. By preferentially performing the processing of S104 to S110, the localization can be executed prior to the generation of the parameter. As a result, the latency in localization can be reduced.

Figure 5:
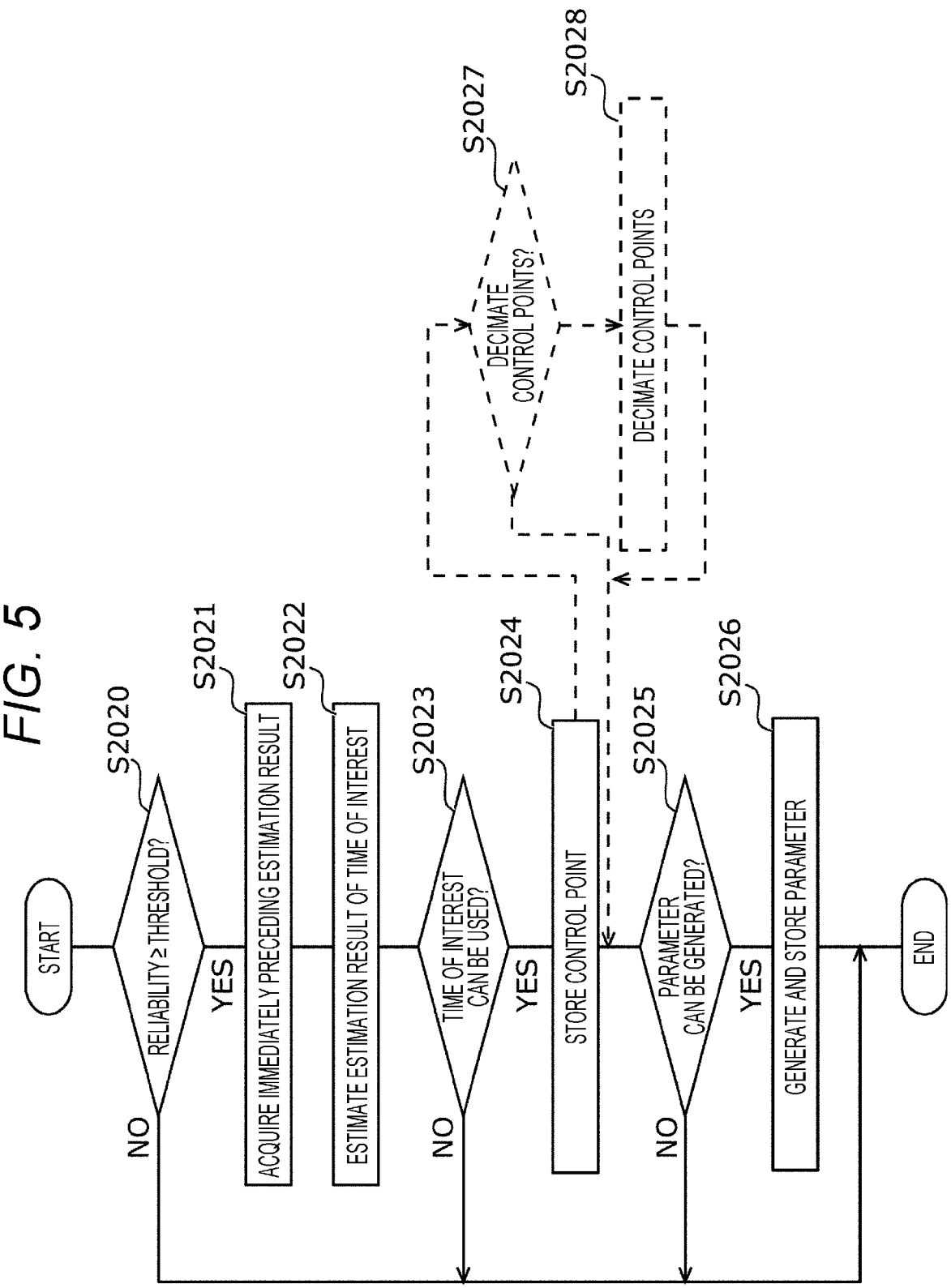
FIG. 5 is a flowchart illustrating transformation parameter generation processing according to the embodiment.

FIG. 5 is a flowchart illustrating details of the transformation parameter generation processing (S202) according to the present embodiment.

First, it is determined whether the reliability of the estimation result acquired at a time of interest (e.g., current time) is equal to or higher than a predetermined threshold (S2020). Note that in a case where the step of S102 is executed in FIG. 4, this processing may be omitted and the processing may unconditionally proceed to YES.

If the reliability of the estimation result is low (S2020: NO), the processing is terminated without generating the parameter. If the reliability of the estimation result is high (S2020: YES), an immediately preceding estimation result is acquired (S2021). As illustrated in FIG. 2, an immediately preceding estimation result indicates the most recent estimation result with respect to the time of interest. For example, in a case where the estimation result acquired at the current time is the first estimation result, the immediately preceding estimation result may be the second estimation result or another estimation result. If the estimation result acquired at the current time is the second estimation result or the like, the immediately preceding estimation result may be the first estimation result. The most recent estimation result with respect to the estimation result based on both of these, that is, the acquired estimation results, may be acquired. As another example, it is possible to acquire the most recent estimation result only when the first estimation result is obtained, or conversely, only when the second estimation result or the like is obtained.

Next, the control point acquisition part 16 estimates an estimation result of the time of interest from the result obtained in S2021 (S2022). For example, as described above, the most recent estimation result of the time of interest is used to first calculate the time difference between the time of interest and the time at which the estimation result is obtained. This time difference is calculated, for example, on the basis of the information stored in S200 of FIG. 4. Then, the estimator 13 estimates the relative position with respect to the time difference by a dead reckoning method such as odometry.

Next, the control point acquisition part 16 determines whether or not the result estimated in S2022 can be used (S2023). Whether or not the estimation result can be used is based on, for example, as described above, the degree of reliability of each other, whether the distance between the estimation results at the same time is not too long, whether the time difference is not too large, or the like. For example, in a case where the determination is made on the basis of the time difference, the determination may be made before the processing of S2021.

If it is determined that the estimation result cannot be used (S2023: NO), the processing is terminated without generating the parameter. If it is determined that the estimation result can be used (S2023: YES), the control point acquisition part 16 stores the estimation results for the same time in the control point storage 18 as a control point (S2024).

Next, the parameter generator 20 determines whether the number of stored control points has reached the number of control points by which parameter generation can be performed (S2025). In a case where the number of sets of control points is insufficient for parameter generation (S2025: NO), the processing is terminated without performing parameter generation.

On the other hand, when the parameter generation is possible (S2025: YES), the parameter generator 20 generates the parameter using the stored control points (S2026). The generated parameter may be stored in an appropriate memory, storage, or the like, or may be stored by the coordinate transformer 22 and be used for coordinate transformation.

The parameter is generated in this manner.

Note that in a case where control point decimation processing is performed, for example, processing as indicated by a broken line may be performed at the timing of the control point storage processing in S2024. For example, it may be determined whether or not to decimate the control points at the timing of storing the control points (S2027), and the control point decimation processing may be executed on the basis of the determination result (S2028).

As described above, according to the present embodiment, in a case where an estimation result having a coordinate system different from the parent coordinates can be acquired, the parameter of the coordinate transformation can be appropriately acquired, and the self-estimation result can be easily corrected. As a result, in a case where a plurality of self-estimation devices is provided, it is possible to acquire an accurate self-estimation result.

Second Embodiment

While the reliability is calculated at the timing when the estimation result is acquired in the above-described embodiment, whether or not the result is reliable (whether reliability is high or low) may be acquired on the basis of the estimation result.

The basic device configuration is similar to that of the position estimation system 1 illustrated in FIG. 1. On the other hand, the reliability is determined on the basis of the estimation result.

Figure 6:
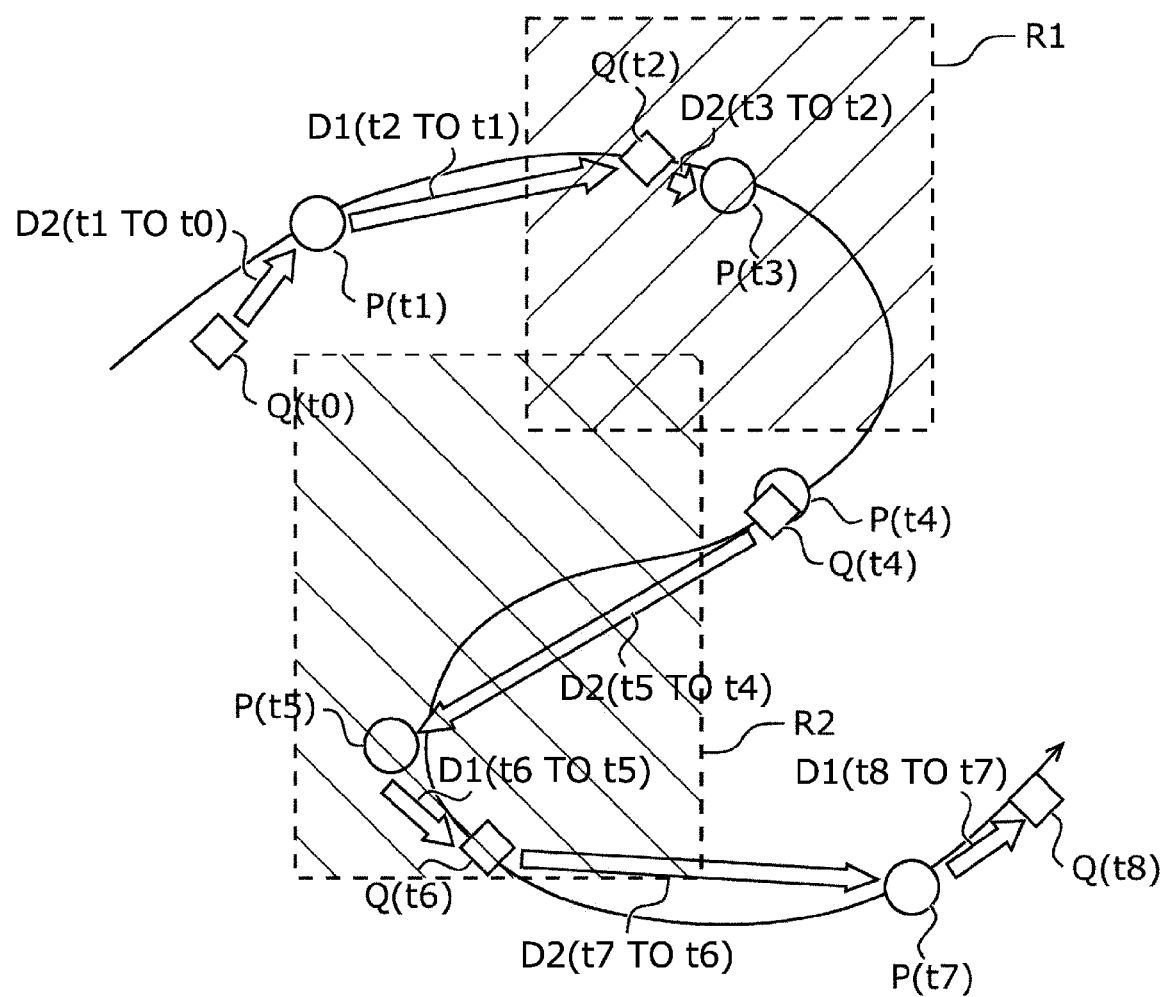
FIG. 6 is a schematic diagram illustrating determination of reliability of control point collection according to an embodiment.

FIG. 6 is a diagram illustrating determination of the reliability according to the present embodiment.

A first region R1 having low reliability of a first estimation result is set in a space where a movable body moves. In a case where the first estimation result estimated by a first estimator 11A belongs to the first region R1, a reliability determination part 14 determines that the first estimation result is unreliable and does not process the first estimation result as a control point.

For example, in a case where a first estimation result P (t3) is acquired by the first estimator 11A, the reliability determination part 14 determines that the first estimation result P (t3) is unreliable and does not acquire the first estimation result P (t3) as a control point. In S102 in FIG. 4 or S2020 in FIG. 5, the determination is made on the basis of whether or not the estimation result is within a predetermined region, instead of performing the threshold processing.

In this case, an information acquisition part 24 may temporarily output the first estimation result P (t3) while not adding the first estimation result P (t3) as a control point according to the reliability. As described above, the localization result of the estimator that can directly derive the estimation result of the parent coordinate system may be used as a localization result to be temporarily output.

As another example, a most recent second estimation result Q (t2) may be acquired, Q (t3) at the same time may be estimated by odometry or the like, and the estimation result may be coordinate-transformed. For example, in FIG. 3, in a case where a first estimation result P3 is in a region R1, if the transformation parameter to be used for coordinate transformation is generated from past first estimation results P2, P1, . . . and past second estimation results Q2, Q1, . . . , a coordinate transformer 22 executes coordinate transformation on a second estimation result Q3. Then, an information acquisition part 24 may acquire and output the estimation result in the first coordinate system transformed on the basis of the transformation parameter by the coordinate transformer 22.

As described above, the information acquisition part 24 may output the position estimation results acquired from the estimators as one localization result by a combination algorithm such as a Kalman filter. As another example, the position estimation results may be used for different purposes. While the algorithm of the combination or the like of the coordinates is not limited, by decoding for use, even in an environment where a specific sensor or algorithm becomes less effective, it is possible to handle information of the self-position without changing the coordinate system by complementarily using the results of other sensors and algorithms.

Not only the first region R1 for the first estimator 11A, but also a second region R2, . . . , for a second estimator 11B, . . . and so on may be set. The first region R1 and the second region R2 may be regions having an overlap. Similarly to the above, in a case where a second estimation result is within the second region R2, it is possible to not acquire the second estimation result as a control point.

This region may be a region set in advance by an operator, a user, or the like according to characteristics of a sensor, an algorithm, or the like. For example, in the case of localization using LiDAR, it is possible not to use an estimation result with low accuracy as a control point, by setting in advance a place where there are many objects with high reflectance, such as mirrors that totally reflect, or a region where many people are likely to be present, for example.

Figure 7:
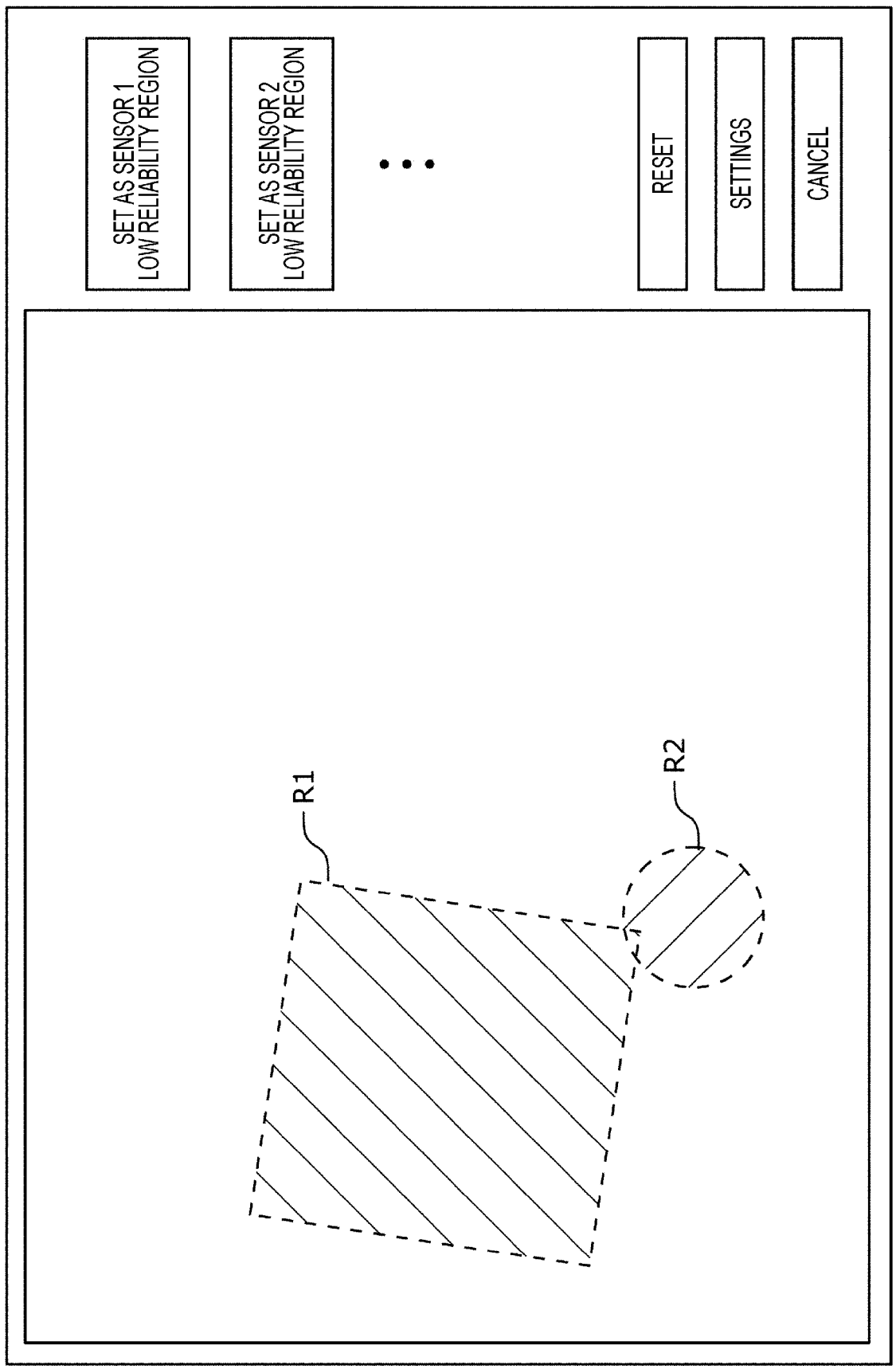
FIG. 7 is a diagram illustrating a GUI for setting a low reliability region according to the embodiment.

FIG. 7 is an example illustrating a graphical user interface (GUI) used in the case of setting regions in advance by the user. A tool having such a user interface may be used, so that a less effective (low reliability) region can be set for each sensor in advance or in real time during movement of the movable body. Additionally, this GUI is presented on a display, for example. On the presented display, a topographic shape, an obstacle, and the like may further be shown in advance on the basis of a map at a position where a region is designated, and the user may set the region on the basis of the shown object and the like.

Additionally, while the description has been given assuming that the first region R1 indicates a positional region, the present invention is not limited thereto. For example, the first region R1 may be a temporal or environmental region. For example, in the case of using LiDAR, the time from the evening to the morning, that is, the time when it gets dark may be set as a time with low reliability. As another example, luminance may be measured and a region with low reliability may be automatically set on the basis of the luminance. Additionally, in a case where the weather is rain, an environment with low reliability may be set. Additionally, a large number of people around may be detected by scale-invariant feature transform (SIFT), histograms of oriented gradients (HOG), or the like, and the reliability for LiDAR may be set low. As described above, the region with low reliability may be set in advance depending on time and environment instead of position, or may be automatically set at the timing of performing localization of the movable body.

As another example, in the case of GPS, it may be possible to determine in advance from how many satellites information can be acquired. Additionally, a place where a shielding object exists vertically above (in the sky direction) the movable body may be set in advance, or it may be automatically determined that a shielding object exists, and the region may be set as a region with low reliability. As described above, the region may be set in advance on the basis of a sensor or an algorithm, or the region may be set by automatic determination.

While the region is set on the basis of one sensor and algorithm in the above description, the present invention is not limited thereto. For example, the reliability may be lowered in a case where an estimation result obtained by coordinate-transforming an acquired estimation result on the basis of the acquisition result of past localization largely deviates from the result of coordinate transformation by a parameter generated by past control points. In this manner, the reliability parameter may be set in the region itself, the reliability may be changed at the timing of performing the position estimation, and in a case where the changed reliability of the region becomes lower than a predetermined threshold, the region may be set as a region with low reliability. Additionally, in the determination of the reliability, reliability according to the above-described embodiment may be used to set the acquired reliability information in the region.

As described above, according to the present embodiment, even in a case where there is an environment in which a sensor and an algorithm are less effective, it is possible to improve the accuracy of a transformation parameter for handling localization results of other sensors and algorithms in the same coordinate system. For this reason, the localization result can be accurately generated and handled in the same coordinate system, and robust localization can be performed even in a case where there is a less effective environment.

For example, all the results can be input to a fusion algorithm such as a Kalman filter to be treated as one localization result. As a result, by compensating for the less effective environment with other sensors and algorithms, for example, in this combination, it is possible to perform robust localization in more various environments without causing a change in the coordinate system of the self-position, an unintended jump, and the like.

There may be combinations of the sensor 10 and the estimator 11 using the same coordinate system as the first coordinate system other than the first sensor 10A and the first estimator 11A. For example, a third sensor 10C and a third estimator 11C may output a third estimation result using the first coordinate system. In this case, even in an environment in which the reliability of the first estimation result is low, if the reliability of the third estimation result is high, a control point acquisition part 16 may acquire, for example, a pair of the second estimation result and the third estimation result for the same time as a control point.

In the present disclosure, the expressions "equal to or greater than" and "equal to or less than" can be rephrased as larger (higher) and smaller (lower). Conversely, the expressions larger (higher) and smaller (lower) can be rephrased as "equal to or greater than" and "equal to or less than".

In the present disclosure, the same time or the same timing does not represent exactly the same moment, but may be a time that can be regarded as the same time, and may be a time including an error such as 30 milliseconds, 50 milliseconds, 60 milliseconds, 100 milliseconds, 500 milliseconds, or equal to or more than 1 second, for example, although it differs depending on the sensor or the like. In the present disclosure, for example, an error in time such as ~1/10, or more strictly, an error in time such as ~1/100 of a cycle (temporal pitch) of acquisition of position estimation or output of a position estimation result by each method may be included. These numerical values are given as examples, and are not limited thereto, and can be appropriately changed by, for example, the desired accuracy of position estimation acquisition, the limitation of processing speed, and the like.

Aspects of the present disclosure may be implemented by a program. The program may be stored in a storage, and information processing by software may be specifically implemented by hardware. Software processing may be implemented by an analog circuit or a digital circuit, such as a field programmable gate array (FPGA), an application specific integrated circuit (ASIC), or a digital signal processor (DSP), for example, in addition to a computer.

The technology according to the present disclosure can be applied to various products. For example, the technology according to the present disclosure may be implemented as a device mounted on any type of movable bodies including an automobile, an electric vehicle, a hybrid electric vehicle, a motorcycle, a bicycle, a personal mobility, an airplane, a drone, a ship, a robot, a construction machine, an agricultural machine (tractor), and the like.

Figure 8:
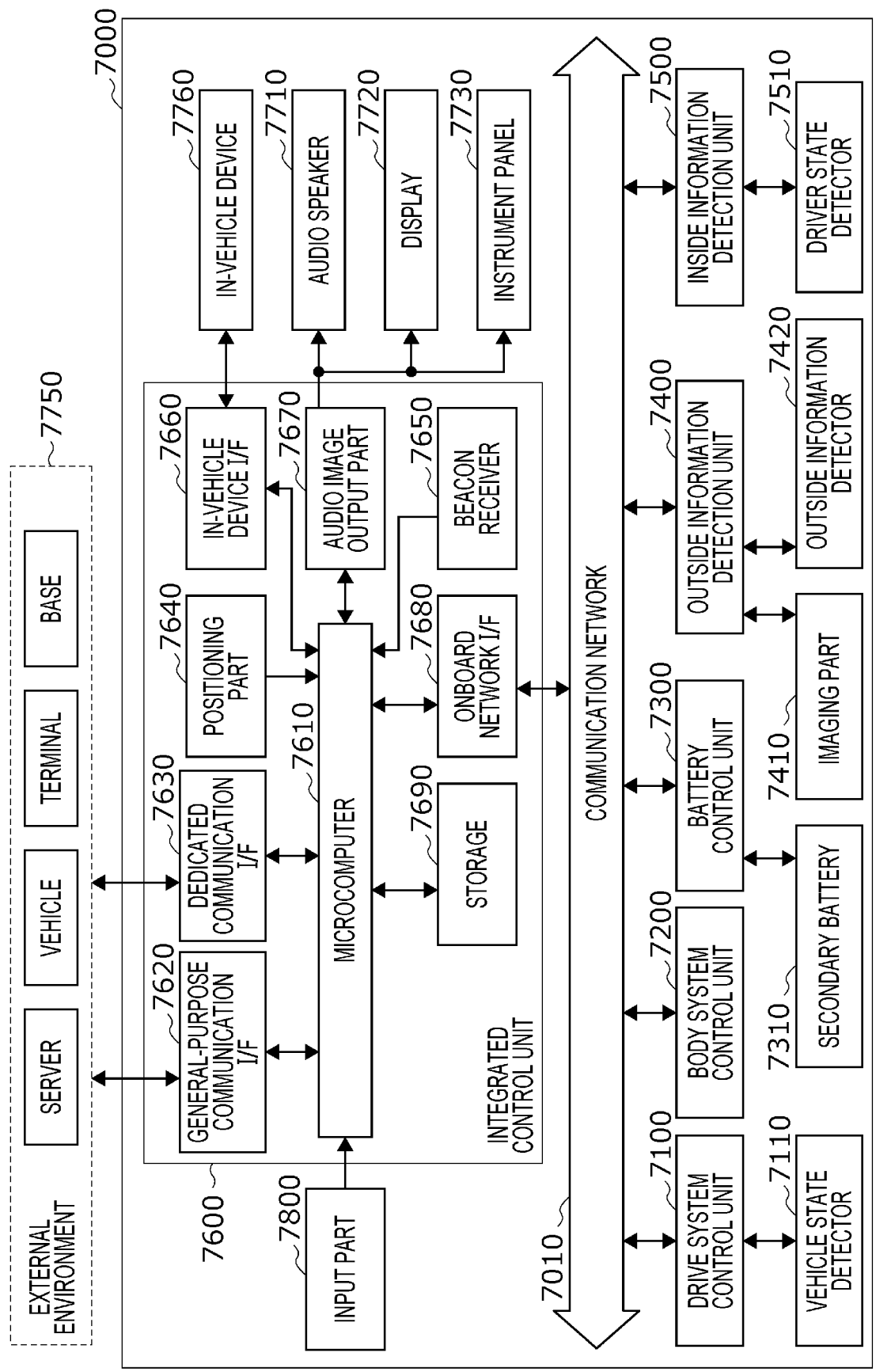
FIG. 8 is a block diagram illustrating an example of a schematic configuration of a vehicle control system.

FIG. 8 is a block diagram illustrating a schematic configuration example of a vehicle control system 7000 which is an example of a mobile control system to which the technology according to the present disclosure can be applied. The vehicle control system 7000 includes a plurality of electronic control units connected through a communication network 7010. In the example illustrated in FIG. 8, the vehicle control system 7000 includes a drive system control unit 7100, a body system control unit 7200, a battery control unit 7300, an outside information detection unit 7400, an inside information detection unit 7500, and an integrated control unit 7600. The communication network 7010 connecting the plurality of control units may be an in-vehicle communication network compliant with an arbitrary standard such as controller area network (CAN), local interconnect network (LIN), local area network (LAN), and FlexRay (registered trademark), for example.

Each control unit includes a microcomputer that performs arithmetic processing according to various programs, a storage that stores a program executed by the microcomputer or parameters used for various arithmetic operations, and a drive circuit that drives various devices to be controlled. Each control unit includes a network I/F for communicating with other control units through the communication network 7010, and a communication I/F for communicating with devices, sensors, or the like inside or outside the vehicle by wired communication or wireless communication. In FIG. 8, as the functional configuration of the integrated control unit 7600, a microcomputer 7610, a general-purpose communication I/F 7620, a dedicated communication I/F 7630, a positioning part 7640, a beacon receiver 7650, an in-vehicle device I/F 7660, an audio image output part 7670, an onboard network I/F 7680, and a storage 7690 are illustrated. The other control units similarly include a microcomputer, a communication I/F, a storage, and the like.

The drive system control unit 7100 controls the operation of devices related to the drive system of the vehicle according to various programs. For example, the drive system control unit 7100 functions as a controller of a drive force generation device for generating a drive force of a vehicle such as an internal combustion engine or a drive motor, a drive force transmission mechanism for transmitting the drive force to wheels, a steering mechanism that adjusts the steering angle of the vehicle, a braking device that generates a braking force of the vehicle, and the like. The drive system control unit 7100 may have a function as a controller of an antilock brake system (ABS), an electronic stability control (ESC), or the like.

A vehicle state detector 7110 is connected to the drive system control unit 7100. The vehicle state detector 7110 includes, for example, at least one of a gyro sensor that detects the angular velocity of the shaft rotational movement of the vehicle body, an acceleration sensor that detects the acceleration of the vehicle, or a sensor for detecting an accelerator pedal operation amount, a brake pedal operation amount, a steering wheel steering angle, an engine speed, a wheel rotation speed, or the like. The drive system control unit 7100 performs arithmetic processing using a signal input from the vehicle state detector 7110 to control an internal combustion engine, a drive motor, an electric power steering device, a brake device, or the like.

The body system control unit 7200 controls the operation of various devices equipped on the vehicle body according to various programs. For example, the body system control unit 7200 functions as a controller of a keyless entry system, a smart key system, a power window device, or various lamps such as a headlamp, a back lamp, a brake lamp, a blinker, or a fog lamp. In this case, the body system control unit 7200 may receive input of radio waves transmitted from a portable device substituting for a key or signals of various switches. The body system control unit 7200 receives input of these radio waves or signals, and controls a door lock device, a power window device, a lamp, and the like of the vehicle.

The battery control unit 7300 controls a secondary battery 7310 that is the power supply source of the drive motor according to various programs. For example, the battery control unit 7300 receives input of information such as the battery temperature, the battery output voltage, or the remaining capacity of the battery from a battery device including the secondary battery 7310. The battery control unit 7300 performs arithmetic processing using these signals to control the temperature adjustment of the secondary battery 7310 or control a cooling device or the like provided in the battery device.

The outside information detection unit 7400 detects information outside the vehicle equipped with the vehicle control system 7000. For example, at least one of an imaging part 7410 or an outside information detector 7420 is connected to the outside information detection unit 7400. The imaging part 7410 includes at least one of a time of flight (ToF) camera, a stereo camera, a monocular camera, an infrared camera, or other cameras. The outside information detector 7420 includes at least one of an environment sensor for detecting the current weather, or an ambient information detection sensor for detecting another vehicle, an obstacle, a pedestrian, or the like around the vehicle equipped with the vehicle control system 7000, for example.

The environment sensor may be at least one of a raindrop sensor that detects rainy weather, a fog sensor that detects fog, a sunshine sensor that detects the degree of sunshine, or a snow sensor that detects snowfall, for example. The ambient information detection sensor may be at least one of an ultrasonic sensor, a radar device, or a light detection and ranging or laser imaging detection and ranging (LIDAR) device. The imaging part 7410 and the outside information detector 7420 may be provided as independent sensors or devices, or may be provided as a device in which a plurality of sensors or devices is integrated.

Figure 9:
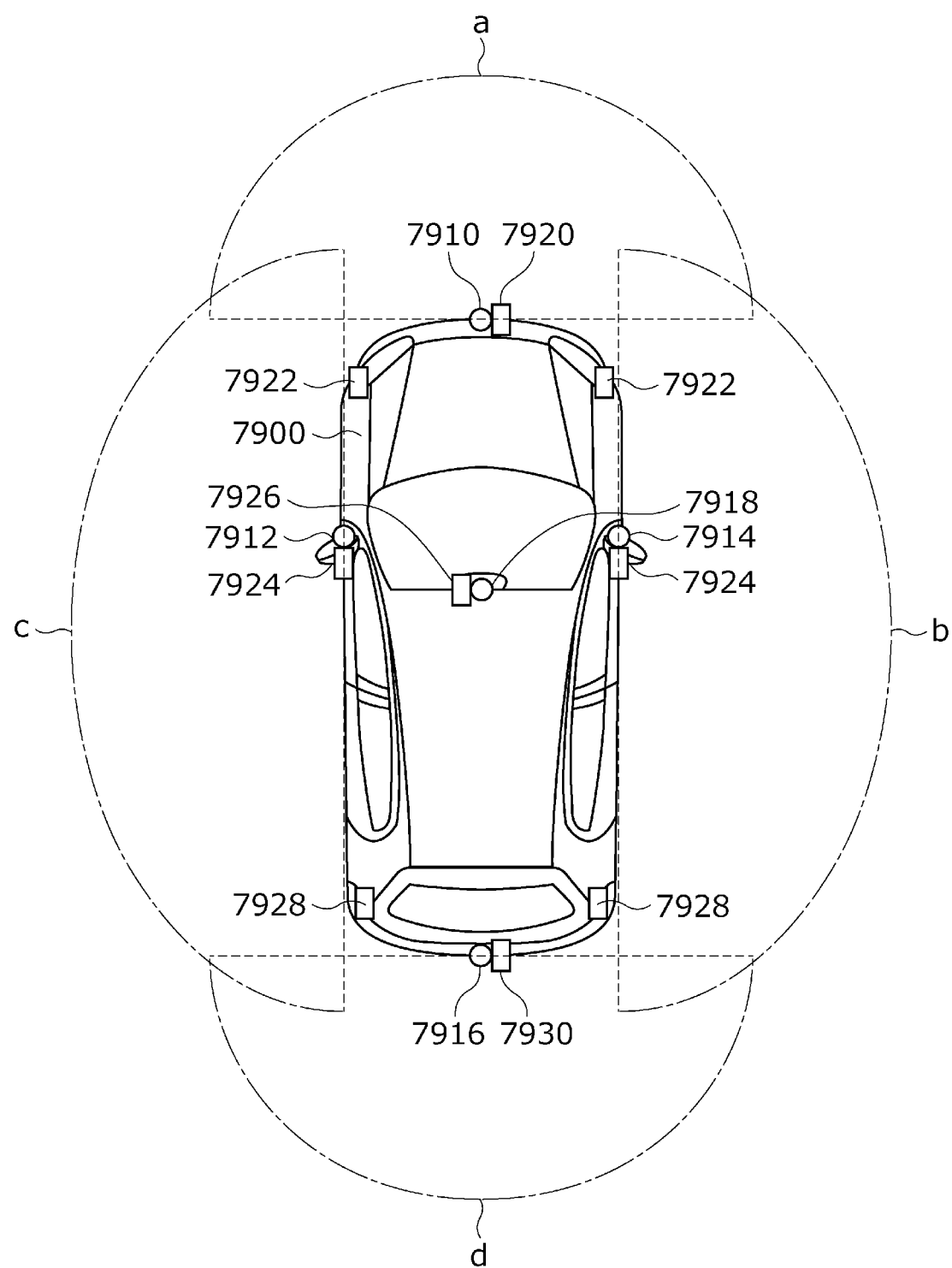
FIG. 9 is an explanatory diagram illustrating an example of installation positions of an outside information detection part and an imaging part.

Here, FIG. 9 shows an example of the installation positions of the imaging part 7410 and the outside information detector 7420. For example, imaging parts 7910, 7912, 7914, 7916, and 7918 are provided in at least one of positions of a front nose, a side mirror, a rear bumper, a back door, or an upper part of a windshield in the vehicle interior of a vehicle 7900. The imaging part 7910 provided on the front nose and the imaging part 7918 provided on the upper part of the windshield in the vehicle interior mainly acquire images of the front of the vehicle 7900. The imaging parts 7912 and 7914 provided on the side mirrors mainly acquire images of the sides of the vehicle 7900. The imaging part 7916 provided on the rear bumper or the back door mainly acquires an image of the rear of the vehicle 7900. The imaging part 7918 provided on the upper part of the windshield in the vehicle interior is mainly used to detect a preceding vehicle, or a pedestrian, an obstacle, a traffic light, a traffic sign, a lane, or the like.

Note that FIG. 9 illustrates an example of the imaging ranges of the imaging parts 7910, 7912, 7914, and 7916. An imaging range a indicates the imaging range of the imaging part 7910 provided on the front nose, imaging ranges b and c indicate the imaging ranges of the imaging parts 7912 and 7914 provided on the side mirrors, respectively, and an imaging range d indicates the imaging range of the imaging part 7916 provided on the rear bumper or the back door. For example, by superimposing the pieces of image data captured by the imaging parts 7910, 7912, 7914, and 7916, a bird's eye view image of the vehicle 7900 as viewed from above can be obtained.

Outside information detectors 7920, 7922, 7924, 7926, 7928, and 7930 provided on the front, rear, sides, corners, and the upper part of the windshield in the vehicle interior of the vehicle 7900 may be ultrasonic sensors or radar devices, for example. The outside information detectors 7920, 7926, and 7930 provided on the front nose, the rear bumper, the back door, and the upper part of the windshield in the vehicle interior of the vehicle 7900 may be LIDAR devices, for example. These outside information detectors 7920 to 7930 are mainly used for detecting a preceding vehicle, a pedestrian, an obstacle, or the like.

Returning to FIG. 8, the description will be continued. The outside information detection unit 7400 causes the imaging part 7410 to capture an image of the outside of the vehicle, and receives the captured image data. Additionally, the outside information detection unit 7400 receives detection information from the outside information detector 7420 connected thereto. In a case where the outside information detector 7420 is an ultrasonic sensor, a radar device, or a LIDAR device, the outside information detection unit 7400 causes transmission of ultrasonic waves, electromagnetic waves, or the like, and receives information on the received reflected waves. The outside information detection unit 7400 may perform object detection processing or distance detection processing of a person, a vehicle, an obstacle, a sign, characters on a road surface, or the like on the basis of the received information. The outside information detection unit 7400 may perform environment recognition processing for recognizing rainfall, fog, road surface conditions, or the like on the basis of the received information. The outside information detection unit 7400 may calculate the distance to the object outside the vehicle on the basis of the received information.

Additionally, the outside information detection unit 7400 may perform image recognition processing or distance detection processing of recognizing a person, a vehicle, an obstacle, a sign, characters on a road surface, or the like on the basis of the received image data. The outside information detection unit 7400 may perform processing such as distortion correction or position adjustment on the received image data, combine pieces of image data captured by different imaging parts 7410, and generate a bird's eye view image or a panoramic image. The outside information detection unit 7400 may perform viewpoint conversion processing using pieces of image data captured by different imaging parts 7410.

The inside information detection unit 7500 detects information inside the vehicle. For example, a driver state detector 7510 that detects a state of a driver is connected to the inside information detection unit 7500. The driver state detector 7510 may include a camera that images the driver, a biometric sensor that detects biometric information of the driver, a microphone that collects voice in the vehicle interior, and the like. For example, the biometric sensor is provided on a seat surface, a steering wheel, or the like, and detects biometric information of an occupant sitting in a seat or a driver who grips the steering wheel. The inside information detection unit 7500 may calculate the degree of fatigue or concentration of the driver or determine whether or not the driver is asleep, on the basis of detection information input from the driver state detector 7510. The inside information detection unit 7500 may perform processing such as noise canceling processing on the collected audio signal.

The integrated control unit 7600 controls overall operations in the vehicle control system 7000 according to various programs. An input part 7800 is connected to the integrated control unit 7600. The input part 7800 is implemented by a device such as a touch panel, a button, a microphone, a switch, or a lever on which an occupant can perform input operation, for example. The integrated control unit 7600 may receive input of data obtained by voice recognition of voice input by a microphone. The input part 7800 may be a remote control device using infrared rays or other radio waves, or an external connection device such as a mobile phone or a personal digital assistant (PDA) compatible with the operation of the vehicle control system 7000, for example. The input part 7800 may be a camera, for example, in which case the occupant can input information by gesture. Alternatively, data obtained by detecting the movement of a wearable device worn by the occupant may be input. Moreover, the input part 7800 may include an input control circuit or the like that generates an input signal on the basis of information input by the occupant or the like using the above input part 7800 and outputs the input signal to the integrated control unit 7600, for example. By operating the input part 7800, the occupant or the like inputs various data or gives an instruction on a processing operation to the vehicle control system 7000.

The storage 7690 may include a read only memory (ROM) that stores various programs executed by the microcomputer, and a random access memory (RAM) that stores various parameters, calculation results, sensor values, or the like. Additionally, the storage 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as global system of mobile communications (GSM) (registered trademark), WiMAX (registered trademark), long term evolution (LTE) (registered trademark), or LTE-advanced (LTE-A), or another wireless communication protocol such as wireless LAN (also referred to as Wi-Fi (registered trademark)) or Bluetooth (registered trademark). For example, the general-purpose communication I/F 7620 may connect to a device (e.g., application server or control server) existing in an external network (e.g., Internet, cloud network, or network unique to business operator) through a base station or an access point. Additionally, for example, the general-purpose communication I/F 7620 may connect with a terminal (e.g., terminal of driver, pedestrian, or store, or machine type communication (MTC) terminal) existing in the vicinity of the vehicle by using the peer to peer (P2P) technology.

The dedicated communication I/F 7630 is a communication I/F that supports a communication protocol designed for use in a vehicle. The dedicated communication I/F 7630 may implement wireless access in vehicle environment (WAVE), which is a combination of the lower layer IEEE802.11p and the upper layer IEEE1609, dedicated short range communications (DSRC), or a standard protocol such as a cellular communication protocol, for example. The dedicated communication I/F 7630 performs V2X communication, which is a concept that typically includes one or more of vehicle to vehicle communication, vehicle to infrastructure communication, vehicle to home communication, and vehicle to pedestrian communication.

For example, the positioning part 7640 receives a global navigation satellite system (GNSS) signal from a GNSS satellite (e.g., global positioning system (GPS) signal from GPS satellite) to perform positioning and generate position information including the latitude, longitude, and altitude of the vehicle. Note that the positioning part 7640 may identify the current position by exchanging signals with a wireless access point, or may acquire position information from a terminal such as a mobile phone, a PHS, or a smartphone having a positioning function.

The beacon receiver 7650 receives radio waves or electromagnetic waves transmitted from a radio station or the like installed on the road, and acquires information such as current location, traffic congestion, traffic restrictions, or required time, for example. Note that the function of the beacon receiver 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish a wireless connection using a wireless LAN, Bluetooth (registered trademark), or a wireless communication protocol such as near field communication (NFC) or Wireless USB (WUSB). Additionally, the in-vehicle device I/F 7660 may establish a wired connection such as universal serial bus (USB), high-definition multimedia interface (HDMI) (registered trademark), mobile high-definition link (MHL), or the like through a connection terminal (and, if necessary, a cable) not shown. The in-vehicle device 7760 may include at least one of a mobile device or a wearable device that an occupant owns, or an information device that is carried in or attached to the vehicle, for example. Additionally, the in-vehicle device 7760 may include a navigation device that searches for a route to an arbitrary destination. The in-vehicle device I/F 7660 exchanges control signals or data signals with these in-vehicle devices 7760.

The onboard network I/F 7680 is an interface that mediates communication between the microcomputer 7610 and the communication network 7010. The onboard network I/F 7680 transmits and receives signals and the like according to a predetermined protocol supported by the communication network 7010.

The microcomputer 7610 of the integrated control unit 7600 controls the vehicle control system 7000 according to various programs, on the basis of information acquired through at least one of the general-purpose communication I/F 7620, the dedicated communication I/F 7630, the positioning part 7640, the beacon receiver 7650, the in-vehicle device I/F 7660, or the onboard network I/F 7680. For example, the microcomputer 7610 may calculate a control target value of the drive force generation device, the steering mechanism, or the braking device on the basis of acquired information on the inside and outside of the vehicle, and output a control command to the drive system control unit 7100. For example, the microcomputer 7610 may perform coordinated control aimed to achieve functions of an advanced driver assistance system (ADAS) including collision avoidance or shock mitigation of the vehicle, follow-up traveling based on an inter-vehicle distance, vehicle speed maintenance traveling, vehicle collision warning, vehicle lane departure warning, or the like. Additionally, the microcomputer 7610 may control the drive force generation device, the steering mechanism, the braking device, or the like on the basis of acquired information on the surroundings of the vehicle, to perform coordinated control aimed for automatic driving of traveling autonomously without depending on the driver's operation, for example.

The microcomputer 7610 may generate, on the basis of information acquired through at least one of the general-purpose communication I/F 7620, the dedicated communication I/F 7630, the positioning part 7640, the beacon receiver 7650, the in-vehicle device I/F 7660, or the onboard network I/F 7680, three-dimensional distance information between the vehicle and objects such as surrounding structures and persons, and create local map information including peripheral information of the current position of the vehicle. Additionally, the microcomputer 7610 may predict a risk of a vehicle collision, proximity of a pedestrian or the like, or entry into a closed road, for example, on the basis of the acquired information, and generate a warning signal. The warning signal may be a signal for sounding a warning sound or lighting a warning lamp, for example.

The audio image output part 7670 transmits an output signal of at least one of audio or image to an output device capable of visually or aurally giving notification of information to an occupant or to the outside of the vehicle. In the example of FIG. 8, an audio speaker 7710, a display 7720, and an instrument panel 7730 are illustrated as examples of the output device. The display 7720 may include at least one of an onboard display or a head-up display, for example. The display 7720 may have an augmented reality (AR) display function. The output device may be a device other than these devices, such as headphones, a wearable device such as an eyeglass-type display worn by an occupant, a projector, or a lamp. In a case where the output device is a display device, the display device visually displays results obtained by various processing performed by the microcomputer 7610 or information received from another control unit in various formats such as text, images, tables, and graphs. Additionally, in a case where the output device is a voice output device, the voice output device converts an audio signal including reproduced voice data, acoustic data, or the like into an analog signal and outputs the analog signal in an auditory manner.

Note that in the example shown in FIG. 8, at least two control units connected through the communication network 7010 may be integrated as one control unit. Alternatively, each control unit may include a plurality of control units. Moreover, the vehicle control system 7000 may include another control unit not shown. Additionally, in the above description, some or all of the functions of any control unit may be provided in another control unit. That is, as long as information is transmitted and received through the communication network 7010, the predetermined arithmetic processing may be performed by any control unit. Similarly, a sensor or device connected to one of the control units may be connected to another control unit, and a plurality of control units may transmit and receive detection information to and from each other through the communication network 7010.

Note that a computer program for implementing each function of the position estimation system 1 according to the present embodiment described with reference to FIG. 1 can be installed in any control unit or the like. Additionally, a computer readable recording medium in which such a computer program is stored can be also provided. The recording medium is, for example, a magnetic disk, an optical disk, a magneto-optical disk, a flash memory, or the like. Additionally, the above computer program may be distributed through a network without using a recording medium, for example.

In the vehicle control system 7000 described above, the position estimation system 1 according to the present embodiment described with reference to FIG. 1 can be applied to the integrated control unit 7600 of the application example illustrated in FIG. 8. For example, the reliability determination part 14, the control point acquisition part 16, the control point storage 18, the parameter generator 20, the coordinate transformer 22, and the information acquisition part 24 of the position estimation system 1 correspond to the microcomputer 7610, the storage 7690, and the onboard network I/F 7680 of the integrated control unit 7600.

Additionally, at least some components of the position estimation system 1 described with reference to FIG. 1 may be implemented in a module (e.g., integrated circuit module including one die) for the integrated control unit 7600 illustrated in FIG. 8. Alternatively, the position estimation system 1 described with reference to FIG. 1 may be implemented by a plurality of control units of the vehicle control system 7000 illustrated in FIG. 8.

The embodiment described above may have the following forms.

(1)
An information processing device including:
a first estimator that estimates a self-position on the basis of a first coordinate system;
a second estimator that estimates a self-position on the basis of a second coordinate system different from the first coordinate system; and
an information acquisition part that, in a case where reliability of one of a first estimation result by the first estimator and a second estimation result by the second estimator in a coordinate system of the one estimation result is lower than a predetermined threshold, generates self-position information on the basis of another estimation result.

(2)
The information processing device according to (1) further including
a coordinate transformer that transforms a position in the second coordinate system into a position in the first coordinate system, in which
the information acquisition part generates the self-position information on the basis of at least one of the first estimation result or the second estimation result transformed into the first coordinate system.

(3)
The information processing device according to (2), in which
the information acquisition part
generates the self-position information on the basis of the first estimation result in a case where a reliability of the first estimation result is equal to or higher than the predetermined threshold, and
generates the self-position information in the first coordinate system on the basis of the second estimation result transformed by the coordinate transformer in a case where the reliability of the first estimation result is lower than the predetermined threshold.

(4)
The information processing device according to (2) or (3), in which
the information acquisition part
does not generate the self-position information in a case where a distance between the first estimation result and the second estimation result transformed by the coordinate transformer acquired at the same timing is longer than a predetermined distance.

(5)
The information processing device according to any one of (2) to (4) further including:
a control point acquisition part that acquires, as a control point, a combination of the first estimation result and the second estimation result acquired at the same timing;
a control point storage that stores the control point acquired by the control point acquisition part; and
a parameter generator that generates a transformation parameter used for transformation by the coordinate transformer on the basis of a first predetermined number or more of control points stored in the control point storage.

(6)
The information processing device according to (5), in which
the control point acquisition part
in a case where the second estimation result for the same time as the acquired first estimation result does not exist, corrects the second estimation result acquired in the past to an estimation result at the time when the first estimation result is acquired,
in a case where the first estimation result for the same time as the acquired second estimation result does not exist, corrects the first estimation result acquired in the past to an estimation result at the time when the second estimation result is acquired, and
acquires the control point.

(7)
The information processing device according to (6), in which
regarding one acquired estimation result, the control point acquisition part corrects a most recent past another estimation result by dead reckoning.

(8)
The information processing device according to any one of (5) to (7), in which
in a case where at least one of the reliability of the first estimation result or the reliability of the second estimation result at the same timing is lower than a predetermined threshold, the control point acquisition part does not acquire a combination at the timing as the control point.

(9)
The information processing device according to any one of (5) to (8), in which
the control point acquisition part deletes one or a plurality of the control points stored in the control point storage in a case where the control points stored in the control point storage are equal to or more than a second predetermined number.

(10)
The information processing device according to (9), in which
the control point acquisition part deletes the control points in ascending order of acquired time.

(11)

The information processing device according to (9), in which the control point acquisition part deletes the control points in ascending order of reliability of any one of the first estimation result or the second estimation result.

(12)

The information processing device according to any one of (5) to (11), in which the control point acquisition part sets an environment in which the first estimation result is not used and an environment in which the second estimation result is not used, and does not acquire the control point in these environments.

(13)

The information processing device according to any one of (1) to (12), in which the first estimator and the second estimator set an environment in which no estimation is performed, and do not estimate the self-position in these environments.

(14)

The information processing device according to (12) or (13), in which the environment is set by a user.

(15)

The information processing device according to any one of (12) to (14), in which the environment is set on the basis of a sensor used for estimation of the self-position or an algorithm that executes estimation of the self-position on the basis of the sensor.

(16)

The information processing device according to any one of (2) to (15) further including a third estimator, . . . , and an Nth estimator (integer of N≥3), in which the coordinate transformer transforms a coordinate system of each of the estimators into the first coordinate system, and the information acquisition part generates the self-position information on the basis of position information estimated by each of the transformed estimators.

(17)

An information processing system including:

a movable body including a first acquisition part that acquires information for estimating a self-position in a first coordinate system, and a second acquisition part that acquires information for estimating a self-position in a second coordinate system different from the first coordinate system; and a first estimator that acquires a first estimation result based on information acquired by the first acquisition part, a second estimator that acquires a second estimation result based on information acquired by the second acquisition part, and an information acquisition part that, in a case where reliability of one of the first estimation result and the second estimation result in a coordinate system of the one estimation result is lower than a predetermined threshold, generates position information of the movable body on the basis of another estimation result, provided inside or outside the movable body.

(18)

An information processing method including:

estimating a self-position on the basis of a first coordinate system by a first estimator;

estimating a self-position on the basis of a second coordinate system different from the first coordinate system by a second estimator; and in a case where reliability of one of a first estimation result by the first estimator and a second estimation result by the second estimator in a coordinate system of the one estimation result is lower than a predetermined threshold, generating self-position information on the basis of another estimation result by an information acquisition part.

(19)

A program causing a computer to execute:

first estimation processing of estimating a self-position on the basis of a first coordinate system;

second estimation processing of estimating a self-position on the basis of a second coordinate system different from the first coordinate system; and information generation processing of, in a case where reliability of one of a first estimation result by the first estimation processing and a second estimation result by the second estimation processing in a coordinate system of the one estimation result is lower than a predetermined threshold, generating self-position information on the basis of another estimation result.

(20)

An information processing device including:

a first estimator that estimates a self-position in a first coordinate system;

a second estimator that estimates a self-position in a second coordinate system different from the first coordinate system;

a coordinate transformer that transforms a second estimation result by the second estimator from the second coordinate system to the first coordinate system on the basis of a transformation parameter;

a storage that stores the first estimation result and the second estimation result as a control point in a case where a reliability of the first estimation result by the first estimator at a time of interest and the reliability of the second estimation result by the second estimator at the time of interest are equal to or higher than a predetermined threshold; and a parameter generator that generates the transformation parameter on the basis of the control point at the time of interest stored in the storage and the control point before the time of interest.

(21)

An information processing device including:

a first estimator that estimates a self-position in a first coordinate system;

a second estimator that estimates a self-position in a second coordinate system different from the first coordinate system;

a coordinate transformer that transforms a second estimation result by the second estimator from the second coordinate system to the first coordinate system on the basis of a transformation parameter;

a storage that sets a first region having low reliability of a first estimation result by the first estimator, evaluates the reliability to be low if the first estimation result at a time of interest is within the first region and evaluates the reliability to be high if the first estimation result at the time of interest is outside the first region, and stores the first estimation result at the time of interest and the second estimation result at the time of interest as a control point in a case where the reliability of the first estimation result at the time of interest is high; and a parameter generator that generates the transformation parameter on the basis of the control point at the time of interest stored in the storage and the control point before the time of interest.

(22)

The information processing device according to (21), in which the first region is a region set in advance.

(23)

The information processing device according to (21) or (22), in which the first region is a region set on the basis of the reliability of the first estimation result.

(24)

The information processing device according to any one of (21) to (23), in which the second estimation result at the time of interest is acquired by correcting the second estimation result acquired most recently in the past with respect to the time of interest to the time of interest.

(25)

The information processing device according to (24), in which the first estimator and the second estimator perform estimation by star reckoning, and the correction to the second estimation result at the time of interest is performed on the basis of a result estimated by dead reckoning.

Aspects of the present disclosure are not limited to the above-described embodiments, but include various conceivable modifications, and the effects of the present disclosure are not limited to the above-described contents. The components in each embodiment may be appropriately combined and applied. That is, various additions, modifications, and partial deletions can be made without departing from the conceptual idea and gist of the present disclosure derived from the contents defined in the claims and equivalents thereof.

REFERENCE SIGNS LIST

1 Position estimation system
10, 10A, 10B, 10X, 12 Sensor
11, 11A, 11B, 11X, 13 Estimator
14 Reliability determination part
16 Control point acquisition part
18 Control point storage
20 Parameter generator
22 Coordinate transformer
24 Information acquisition part

The invention claimed is:

1. An information processing device, comprising:
a first estimator configured to estimate a first self-position based on a first coordinate system to obtain a first estimation result;
a second estimator configured to estimate a second self-position based on a second coordinate system to obtain a second estimation result, wherein the second coordinate system is different from the first coordinate system;
a coordinate transformer configured to transform the second self-position in the second coordinate system into a position in the first coordinate system for transformation of the second estimation result into the first coordinate system; and
a processor configured to:
in a case where a reliability of one of the first estimation result by the first estimator or the second estimation result by the second estimator is lower than a threshold, acquire self-position information based on a third estimation result; and
in a case where at least one of the first estimation result or the second estimation result transformed into the first coordinate system has the reliability one of equal to or higher than the threshold, acquire the self-position information based on the at least one of the first estimation result or the second estimation result transformed into the first coordinate system.

2. The information processing device according to claim 1, wherein the processor is further configured to:
acquire the self-position information based on the first estimation result in a case where the reliability of the first estimation result is one of equal to or higher than the threshold; and
acquire the self-position information in the first coordinate system based on the transformed second estimation result in a case where the reliability of the first estimation result is lower than the threshold.

3. The information processing device according to claim 1, wherein
a timing of acquisition of the first estimation result is same as a timing of acquisition of the second estimation result, and
the processor is further configured to not generate the self-position information in a case where a distance between the first estimation result and the transformed second estimation result is longer than a specific distance.

4. The information processing device according to claim 1, further comprising a control point storage and a parameter generator, wherein
in a case where a timing of acquisition of the first estimation result is same as a timing of acquisition of the second estimation result, the processor is further configured to acquire, as a control point, a combination of the first estimation result and the second estimation result,
the control point storage is configured to store a plurality of control points, wherein the plurality of control points includes the control point,
the parameter generator is configured to generate a transformation parameter for the transformation of the second estimation result by the coordinate transformer, and
the generation of the transformation parameter is based on a first number of the stored plurality of control points.

5. The information processing device according to claim 4, wherein the processor is further configured to:
in a case where the second estimation result for the same time as the first estimation result does not exist, correct the second estimation result acquired in past to a specific estimation result at a time of acquisition of the first estimation result;
in a case where the first estimation result for the same time as the second estimation result does not exist, correct the first estimation result acquired in past to a specific estimation result at a time of acquisition of the second estimation result; and
acquire the control point based on the correction of at least one of the second estimation result or the first estimation result.

6. The information processing device according to claim 5, wherein
the processor is further configured to correct a most recent past estimation result by dead reckoning process.

7. The information processing device according to claim 4, wherein
in a case where at least one of the reliability of the first estimation result or the reliability of the second estimation result is lower than the threshold, the processor is further configured to not acquire a combination at the timing as the control point.

8. The information processing device according to claim 4, wherein the processor is further configured control deletion of at least one control point of the stored plurality of control points in a case where the stored plurality of control points is one of equal to or more than a second number.

9. The information processing device according to claim 8, wherein the processor is further configured to control the deletion of the at least one control point in an ascending order of acquired time of the stored plurality of control points.

10. The information processing device according to claim 8, wherein the processor is further configured to control the deletion of the at least one control point in an ascending order of the reliability of one of the first estimation result or the second estimation result.

11. The information processing device according to claim 4, wherein the processor is further configured to:
set a first environment in which the first estimation result is unusable, and a second environment in which the second estimation result is unusable; and
not acquire the control point in the first environment and the second environment.

12. The information processing device according to claim 1, wherein each of the first estimator and the second estimator is further configured to set an environment in which the estimation of the first self-position and the estimation of the second self-position is not performed.

13. The information processing device according to claim 1, further comprising a plurality of estimators that includes the first estimator, the second estimator, and a third estimator, wherein
each estimator of the plurality of estimators is configured to estimate position information,
the coordinate transformer is further configured to transform a plurality of coordinate systems of the plurality of estimators into the first coordinate system,
the plurality of coordinate systems includes the first coordinate system and the second coordinate system,
each coordinate system of the plurality of coordinate systems corresponds to a respective estimator of the plurality of estimators, and
the processor is further configured to acquire the self-position information based on the position information.

14. An information processing system, comprising:
a movable body that comprises:
a processor configured to:
acquire first information for estimation of a first self-position in a first coordinate system; and
acquire second information for estimation of a second self-position in a second coordinate system different from the first coordinate system;
a first estimator configured to estimate the first self-position based on the acquired first information to obtain a first estimation result;
a second estimator configured to estimate the second self-position based on the acquired second information to obtain a second estimation result; and
a coordinate transformer configured to transform the second self-position in the second coordinate system into a position in the first coordinate system for transformation of the second estimation result into the first coordinate system, wherein the processor is further configured to:
in a case where a reliability of one of the first estimation result or the second estimation result is lower than a threshold, acquire position information of the movable body based on a third estimation result; and
in a case where at least one of the first estimation result or the second estimation result transformed into the first coordinate system has the reliability one of equal to or higher than the threshold, acquire the position information based on the at least one of the first estimation result or the second estimation result transformed into the first coordinate system.

15. An information processing method, comprising:
estimating, by a first estimator, a first self-position based on a first coordinate system to obtain a first estimation result;
estimating, by a second estimator, a second self-position based on a second coordinate system to obtain a second estimation result, wherein the second coordinate system is different from the first coordinate system;
transforming, by a coordinate transformer, the second self-position in the second coordinate system into a position in the first coordinate system for transformation of the second estimation result into the first coordinate system;
in a case where a reliability of one of the first estimation result by the first estimator or the second estimation result by the second estimator is lower than a threshold, acquiring self-position information based on a third estimation result; and
in a case where at least one of the first estimation result or the second estimation result transformed into the first coordinate system has the reliability one of equal to or higher than the threshold, acquiring the self-position information based on the at least one of the first estimation result or the second estimation result transformed into the first coordinate system.

16. A non-transitory computer readable medium having stored thereon, computer executable instructions, which when executed by a computer, cause the computer to execute operations, the operations comprising:
estimating, by a first estimator, a first self-position based on a first coordinate system to obtain a first estimation result;
estimating, by a second estimator, a second self-position based on a second coordinate system to obtain a second estimation result, wherein the second coordinate system is different from the first coordinate system;
transforming, by a coordinate transformer, the second self-position in the second coordinate system into a position in the first coordinate system for transformation of the second estimation result into the first coordinate system;
in a case where a reliability of one of the first estimation result or the second estimation result is lower than a threshold, acquiring self-position information based on a third estimation result; and in a case where at least one of the first estimation result or the second estimation result transformed into the first coordinate system has the reliability one of equal to or higher than the threshold, acquiring the self-position information based on the at least one of the first estimation result or the second estimation result transformed into the first coordinate system.

17. An information processing device, comprising:
a first estimator configured to estimate a first self-position in a first coordinate system to obtain a first estimation result;
a second estimator configured to estimate a second self-position in a second coordinate system to obtain a second estimation result, wherein the second coordinate system is different from the first coordinate system;
a coordinate transformer configured to transform the second estimation result by the second estimator from the second coordinate system to the first coordinate system based on a transformation parameter;
a storage configured to store the first estimation result and the second estimation result as a first control point in a case where a reliability of the first estimation result by the first estimator at a time of interest and a reliability of the second estimation result by the second estimator at the time of interest are one of equal to or higher than a threshold; and
a parameter generator configured to generate the transformation parameter based on:
the first control point at the time of interest stored in the storage, and
a second control point before the time of interest.

18. An information processing device, comprising:
a first estimator configured to estimate a first self-position in a first coordinate system to obtain a first estimation result;
a second estimator configured to estimate a second self-position in a second coordinate system to obtain a second estimation result, wherein the second coordinate system is different from the first coordinate system;
a coordinate transformer configured to transform the second estimation result by the second estimator from the second coordinate system to the first coordinate system based on a transformation parameter;
a processor configured to:
set a first region having a reliability of the first estimation result lower than a certain value,
evaluate the reliability to be low in a case where the first estimation result at a time of interest is within the first region;
evaluate the reliability to be high in a case where the first estimation result at the time of interest is outside the first region; and
control a storage to store the first estimation result at the time of interest and the second estimation result at the time of interest as a first control point in a case where the reliability of the first estimation result at the time of interest is high; and
a parameter generator configured to generate the transformation parameter based on the first control point at the time of interest and a second control point before the time of interest.

19. The information processing device according to claim 18, wherein the first region is set in advance.

* * * * *